United States Patent [19]

Salmon

[11] 4,312,927
[45] Jan. 26, 1982

[54] ENERGY CONVERSION AND STORAGE PROCESS

[75] Inventor: Oliver N. Salmon, St. Paul, Minn.

[73] Assignee: Minnesota Mining and Manufacturing Company, St. Paul, Minn.

[21] Appl. No.: 163,514

[22] Filed: Jun. 27, 1980

[51] Int. Cl.³ .............................................. H01M 8/06
[52] U.S. Cl. ........................................ 429/17; 429/20; 429/26; 429/199; 429/112; 429/34
[58] Field of Search .................... 429/16, 17, 19, 20, 429/26, 33, 120, 34, 199, 202, 112, 101, 102, 103

[56] References Cited

U.S. PATENT DOCUMENTS

| 3,374,120 | 3/1968 | Lawson | 429/17 |
| 3,553,017 | 1/1971 | Morrill | 429/57 |
| 4,064,325 | 12/1977 | Grenness | 429/104 |

FOREIGN PATENT DOCUMENTS 2605899 2/1976 Fed. Rep. of Germany .

OTHER PUBLICATIONS

Bowman, Conference Proceedings–1st World Hydrogen Energy Conference, Miami Beach, Fla., Mar. 1–3, 1976.
Elliot, Symposium in High Temperature Metal Halide Chemistry (Electrochemical Society), vol. 78-1 (1977).
Elliot, Conference on Thermodynamics and National Energy Problems (AD/A-012 702), Jun. 1974.
Funk, Conference Proceedings–1st World Hydrogen Energy Conference, Miami Beach, Fla., Mar. 1–3, 1976.

Primary Examiner—Anthony Skapars
Attorney, Agent, or Firm—Cruzan Alexander; Donald M. Sell; Lorraine R. Sherman

[57] ABSTRACT

An energy conversion process for converting thermal energy into stored electrochemical energy and then into electrical energy comprising heating a first $FeCl_2$-containing electrolyte melt to produce gaseous $FeCl_3$ and a reductant product in a first chemical reaction, these reaction products being separated, cooled, optionally stored, and combined in a second $FeCl_2$-containing electrolyte melt to cause a reaction to take place which is the reverse of said first reaction, thereby regenerating said first melt and producing heat and electrical energy.

25 Claims, 9 Drawing Figures

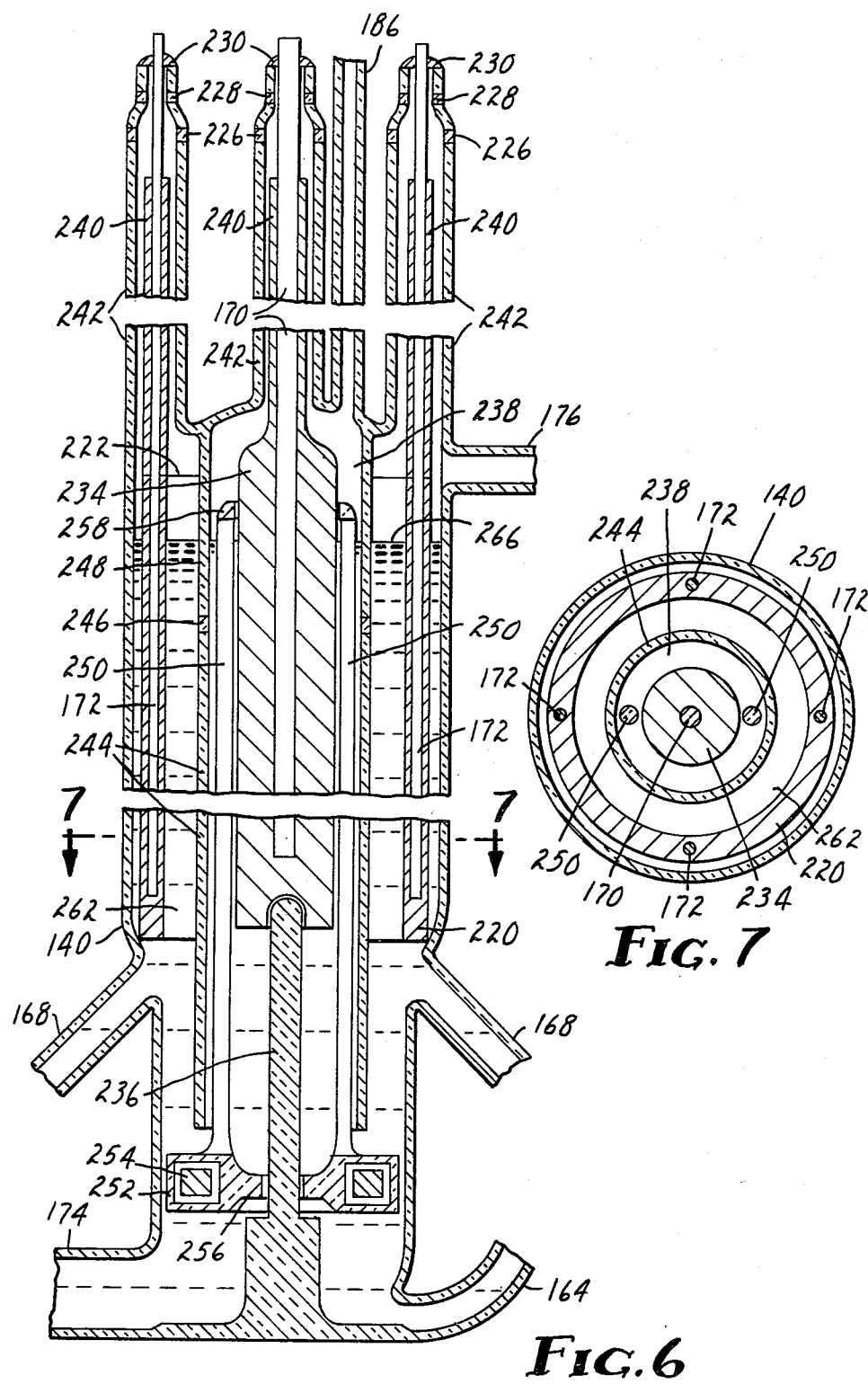

ENERGY CONVERSION AND STORAGE PROCESS

TECHNICAL FIELD

This invention relates to an energy conversion and storage process which utilizes an electrochemical reaction to low temperature yielding electrical energy with a high temperature regeneration reaction that is the thermal reversal of the electrochemical process. In another aspect, it relates to apparatus for said process.

BACKGROUND ART

There is currently considerable interest and research into ways to convert solar energy to electrical energy to help overcome the present society's dependence on a diminishing supply of fossil fuels and the problem-ridden nuclear fuels. Almost 50% of oil refined in the United States is imported and it is becoming increasingly important to utilize other energy sources to satisfy our technological society's need for electrical energy.

The chemical literature contains numerous references to consideration of hydrogen as an energy carrier. Producing hydrogen from water affords a means of energy conversion by which thermal energy from a primary source, such as solar or nuclear fusion or fission, can be changed into an easily transportable and ecologically acceptable fuel and was a subject considered by Dr. James E. Funk, Conference Proceedings—1st World Hydrogen Energy Conference, Miami Beach, Fla., Mar. 1-3, 1976. Dr. Melvin G. Bowman at the same conference disclosed aqueous iron-chloride cycles for hydrogen production.

Other art in the area utilizes metallic salts. G. R. B. Elliot, Conference on Thermodynamics and National Energy Problems (AD/A-012 702), June 1974, disclosed electrochemical heat engines wherein energy is produced by charging under conditions of low voltage and discharging under conditions of high voltage. The only electrochemical reaction mentioned was:

$$K_2S(FS) \rightleftharpoons 2K(g) + \tfrac{1}{2} S_2(g)$$

where (FS) refers to fused salt and (g) refers to gas phase. In a 1977 paper of the proceedings of the Symposium in High Temperature Metal Halide Chemistry (Electrochemical Society), Vol. 78-1, G. R. B. Elliot disclosed an electrochemical heat engine employing the electrochemical reaction $$2Li(l) + I_2(g) \rightleftharpoons 2LiI(FS)$$

where (l) refers to liquid phase.

Additional art in the area discloses aqueous iron chlorides. For example, U.S. Pat. No. 3,553,017 discloses electrochemical power units, more particularly storage batteries, utilizing the electrochemical reaction $$1.5FeCl_2(aq) \rightleftharpoons 0.5Fe(s) + FeCl_3(aq)$$

where (aq) refers to an aqueous solution and (s) refers to solid phase. This is an aqueous system not involving gaseous FeCl$_3$ as a product which is necessary in the present invention. M. Warshay and L. D. Wright, J. Electrochem. Soc. 124, 173 (1977) discuss cost and size estimates for electrochemical bulk energy storage for use by electrical utilities via the aqueous reaction:

$$TiCl_4(aq) + FeCl_2(aq) \rightleftharpoons TiCl_3(aq) + FeCl_3(aq)$$

German Pat. No. 2,605,899 discloses a storage battery probably utilizing the following reaction:

$$Fe(AlCl_4)_2(FS) + NaAlCl_4(FS) \rightleftharpoons Na(l) + FeCl_3(FS) + 3AlCl_3(FS)$$

where (FS) refers to fused salt chloride melt. Again, this patent does not teach gaseous FeCl$_3$, an essential product of the present invention.

U.S. Pat. No. 3,374,120 discloses decomposition of fused salts, including iron halides, into their elemental constituents as a basis for the generation of electrical energy from thermal energy.

U.S. Pat. No. 4,064,325 discloses electric storage batteries utilizing a molten alkali metal negative electrode and an iron III/iron II or iron III/iron metal halide redox couple at the positive electrode, the nature and proportions of said materials being chosen to insure that a liquid state is maintained.

None of the prior art discloses electrochemical heat engine processes for the conversion of thermal energy, e.g., solar energy, to stored electrochemical energy and subsequently to electrical energy utilizing the chemical reactions of the present invention nor the apparatus that will be described in detail below. In addition, the present invention provides long-term storage of electrochemical energy and utilizes readily available and economical materials. Also, the oxidant product, gaseous FeCl$_3$, results in an unexpectedly large decrease in the free energy change for the electrochemical reaction of the cell, upon charging, per 100° C. rise in temperature. Furthermore, mobility may be imparted to both redox products, for example, Fe(s) and FeCl$_3$(g). Fe(s) is magnetic and easily moved by means of magnetic fields and FeCl$_3$ is volatile above 316° C. and hence can be removed as gas from solution above this temperature.

DISCLOSURE OF THE INVENTION

The present invention provides an energy conversion process for converting thermal energy into stored electrochemical energy and then into electrical energy, comprising the steps of:

(a) heating, for example by means of solar energy, a first FeCl$_2$-containing electrolyte melt, optionally containing one or more other metal chloride compounds, in an electrochemical charging cell, said melt comprising at least about 10 mole percent FeCl$_2$ and up to 90 mole percent of said other metal chloride compounds, to cause a first chemical reaction to take place producing (1) gaseous FeCl$_3$, and
(2) a reductant product which is free iron and/or, where said optional metal chloride compound is present and is reduced in said chemical reaction, the reductant product of said optional reduced metal chloride compound, the purpose of said other metal chloride compounds being to reduce the freezing point of said melt, increase its electrical conductivity, or provide the source for the reductant product of said reaction, without preventing the discharge of gaseous FeCl$_3$ or the discharge of a complex thereof with other metal chloride compounds, from which complex gaseous FeCl$_3$ can be separated by heating said complex, said cell having electrodes therein and an electrical potential applied across said electrodes when the operating temperature of said cell is between the boiling point of FeCl$_3$ and the boiling point of FeCl$_2$ and when the free energy change for the cell charging reaction is positive, (b) separating said gaseous FeCl$_3$ and said reductant product of said reaction, (c) cooling the resulting separated gaseous FeCl$_3$ and reductant product to a temperature lower than the temperature of said reaction, (d) optionally storing said separated FeCl$_3$ and reductant product, and (e) combining, at a temperature below that of said charging cell, said separated FeCl$_3$ and reductant product with a second FeCl$_2$-containing electrolyte melt in an electrochemical discharging cell containing electrodes to cause a second chemical reaction to take place which is the reverse of said first reaction, thereby generating said first melt, heat, and electrical energy, said electrical energy being in excess of said consumed electrical energy of step (a) and is derived from the heat absorbed in step (a), said second melt comprising 3 to 33 mole percent FeCl$_2$ and 67 to 97 mole percent of one or more other metal chloride compounds which reduce the freezing point of said discharging melt or increase its electrical conductivity.

The present invention provides, in another embodiment, an energy conversion process for converting thermal energy into stored electrochemical energy and then into electrical energy comprising the steps of:

(a) heating, for example by means of solar energy, a first FeCl$_2$-containing electrolyte melt in an electrochemical charging cell to an operating temperature above the boiling point of FeCl$_3$ to cause a first chemical reaction

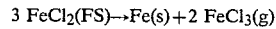

$$3\ FeCl_2(FS) \rightarrow Fe(s) + 2\ FeCl_3(g)$$

to take place, said first melt comprising at least about 10 mole percent of FeCl$_2$ and up to 90 mole percent of one or more other metal chloride compounds which reduce the freezing point of the melt or increase its electrical conductivity without preventing the discharge of gaseous FeCl$_3$ or a complex thereof with other metal chloride compounds, from which complex gaseous FeCl$_3$ can be separated by heating said complex, said cell having electrodes therein and an electrical potential applied across said electrodes when the operating temperature of said cell is between the boiling point of FeCl$_3$ and the boiling point of FeCl$_2$ and when the free energy change for said first reaction is positive, (b) separating said gaseous FeCl$_3$ and said free iron, (c) cooling the resulting separated gaseous FeCl$_3$ and free iron to a temperature lower than the operating temperature in said charging cell, (d) optionally storing said separated FeCl$_3$ and free iron, (e) combining, at a temperature below that of said charging cell, said separated FeCl$_3$ and free iron in a second FeCl$_2$-containing discharging electrolyte melt in an electrochemical discharging cell containing electrodes, to cause a second chemical reaction

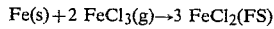

$$Fe(s) + 2\ FeCl_3(g) \rightarrow 3\ FeCl_2(FS)$$

to take place, which is the reverse of said first reaction, thereby generating said first melt, heat, and electrical energy, said second melt comprising 3 to 33 mole percent FeCl$_2$ and 67 to 97 mole percent of one or more other metal chloride compounds which reduce the freezing point of said discharging melt or increase its electrical conductivity.

As described above, the process of the invention has five major steps, hereinafter for brevity (a) is referred to as charging, (b) as separating, (c) as cooling, (d) as storing, and (e) as discharging.

As mentioned above, the FeCl$_2$-containing electrolyte melt of the charging and discharging cells may independently contain one or more other metal chloride compounds, namely metal chlorides such as Na$_3$CrCl$_6$, NaFeCl$_4$, CrCl$_3$, NaCl, KCl, AlCl$_3$, Na$_3$CrCl$_5$, NaFeCl$_3$, CrCl$_2$, and mixtures thereof, such that during charging at high temperatures (between the boiling point of FeCl$_3$ and slightly above the boiling point of FeCl$_2$) FeCl$_2$ is oxidized to gaseous FeCl$_3$ at the positive electrode and the appropriate metal chloride is reduced to Fe, Na or a metal chloride at the negative electrode. During discharging at lower temperatures to produce electrical energy, FeCl$_3$ is reduced to FeCl$_2$ at the positive electrode and Fe, Na or a reduced metal chloride is oxidized to the corresponding metal chloride at the negative electrode.

When using FeCl$_2$ and, optionally, other metal chloride compounds which are reduced in the chemical reaction in the charging cell melt, equations for general reactions to convert and store electrochemical energy and produce electrical energy in this invention are:

$$3\ FeCl_2 \rightleftharpoons Fe + 2\ FeCl_3 \tag{1}$$

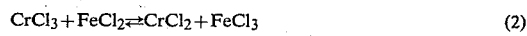

$$CrCl_3 + FeCl_2 \rightleftharpoons CrCl_2 + FeCl_3 \tag{2}$$

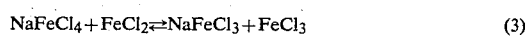

$$NaFeCl_4 + FeCl_2 \rightleftharpoons NaFeCl_3 + FeCl_3 \tag{3}$$

and the more specific reactions,

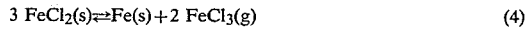

$$3\ FeCl_2(s) \rightleftharpoons Fe(s) + 2\ FeCl_3(g) \tag{4}$$

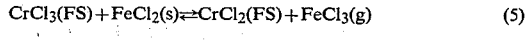

$$CrCl_3(FS) + FeCl_2(s) \rightleftharpoons CrCl_2(FS) + FeCl_3(g) \tag{5}$$

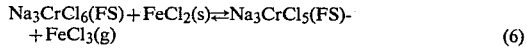

$$Na_3CrCl_6(FS) + FeCl_2(s) \rightleftharpoons Na_3CrCl_5(FS) + FeCl_3(g) \tag{6}$$

$$NaFeCl_4(FS) + FeCl_2(s) \rightleftharpoons NaFeCl_3(FS) + FeCl_3(g) \tag{7}$$

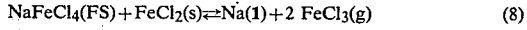

$$NaFeCl_4(FS) + FeCl_2(s) \rightleftharpoons Na(l) + 2\ FeCl_3(g) \tag{8}$$

the forward reactions taking place in the charging cell and the reverse reactions taking place in the discharging cell. Reaction (8) requires a sodium ion-conducting solid electrolyte as a cell separator. Where mixed reactants are present, one or more of the above reactions may take place, equations 2, 3, 5, 6, and 7 generally taking place preferentially over 1, 4, and 8.

The charging cell for all the above-mentioned reactions is operated between 316° and 1050° C. at about one atmosphere gas pressure (between the boiling point of FeCl$_3$ and slightly above the boiling point of FeCl$_2$) and preferably between 500° C. and 750° C. To minimize apparatus corrosion problems it is often desirable to operate the charging cell at temperatures lower than 677° C., the normal freezing point of FeCl$_2$. For charging below 500° C. the overall process is less efficient than desirable. The discharging cell is operated at temperatures lower than those in the charging cell and preferably, for maximum efficiency, at temperatures between 200° C. and 350° C. Often, mixtures of salts exhibit the known effect of providing a lower freezing point than any of the salts would have alone and this effect is advantageous in both the charging and discharging cells. (As is well known in the art, the boiling points of these compounds vary with a change in pressure under which they exist). In addition, it is often useful for the compounds added to the $FeCl_2$-containing electrolyte melt to provide ions to assist in carrying electrical current within the cells.

Removal of $FeCl_3$ as a gaseous product in the charging cell depends on its relatively low boiling point of 316° C. Metal chloride compounds useful as components of the $FeCl_2$-containing electrolyte melt do not inhibit the volatility of gaseous $FeCl_3$ at its normal boiling point. NaCl, KCl, or $AlCl_3$ are useful as said metal chloride components of the melt to reduce the freezing point of the melt and to increase its electrical conductivity.

It is desirable that the other metal chloride components (viz., NaCl, KCl, or $AlCl_3$) of the $FeCl_2$-containing electrolyte melt are soluble therein, that they do not undergo oxidation and reduction in the positive electrode chambers during the operation of the cells and it is preferable that the other metal chloride components be non-volative. However, it is not necessary that $FeCl_3$ be the only cell component that volatilizes alone. $FeCl_3$ may be part of a volatilizing mixture if it can be separated therefrom in the separating step.

In the charging cell it is preferable that the electrolyte melt in the positive electrode chamber be as close as possible to saturation with respect to $FeCl_2$. Such a melt, for a given temperature and pressure, ensures the lowest possible charging voltage, for a given composition of negative chamber electrolyte.

The present invention provides a practical, efficient, and economical process for conversion of high temperature heat, preferably solar heat, to electrochemical energy, and subsequently to electrical energy. Electrical energy is produced by charging an electrochemical cell at higher temperature under conditions of lower voltage and discharging at lower temperature under conditions of higher voltage. It has been found that the charging voltage required in the charging cell decreases by about 0.23 volt for every 100° C. increase in operating temperature of the charging cell. In addition, a method is provided for the storing of electrochemical energy at low temperatures (i.e., 315° C. or below) for extended periods. In the process of the present invention, the electrochemical charging cell chemical feed materials are regenerated by the electrochemical discharging cell. The process for the invention and apparatus therefor are disclosed herein.

BRIEF DESCRIPTION OF THE DRAWINGS

In the accompanying drawings:

FIG. 6 is a vertical cross-section of a charging cell in accordance with the invention;

FIG. 7 is a cross-section of FIG. 6 taken along the line 7—7;

DETAILED DESCRIPTION

Figure 1:
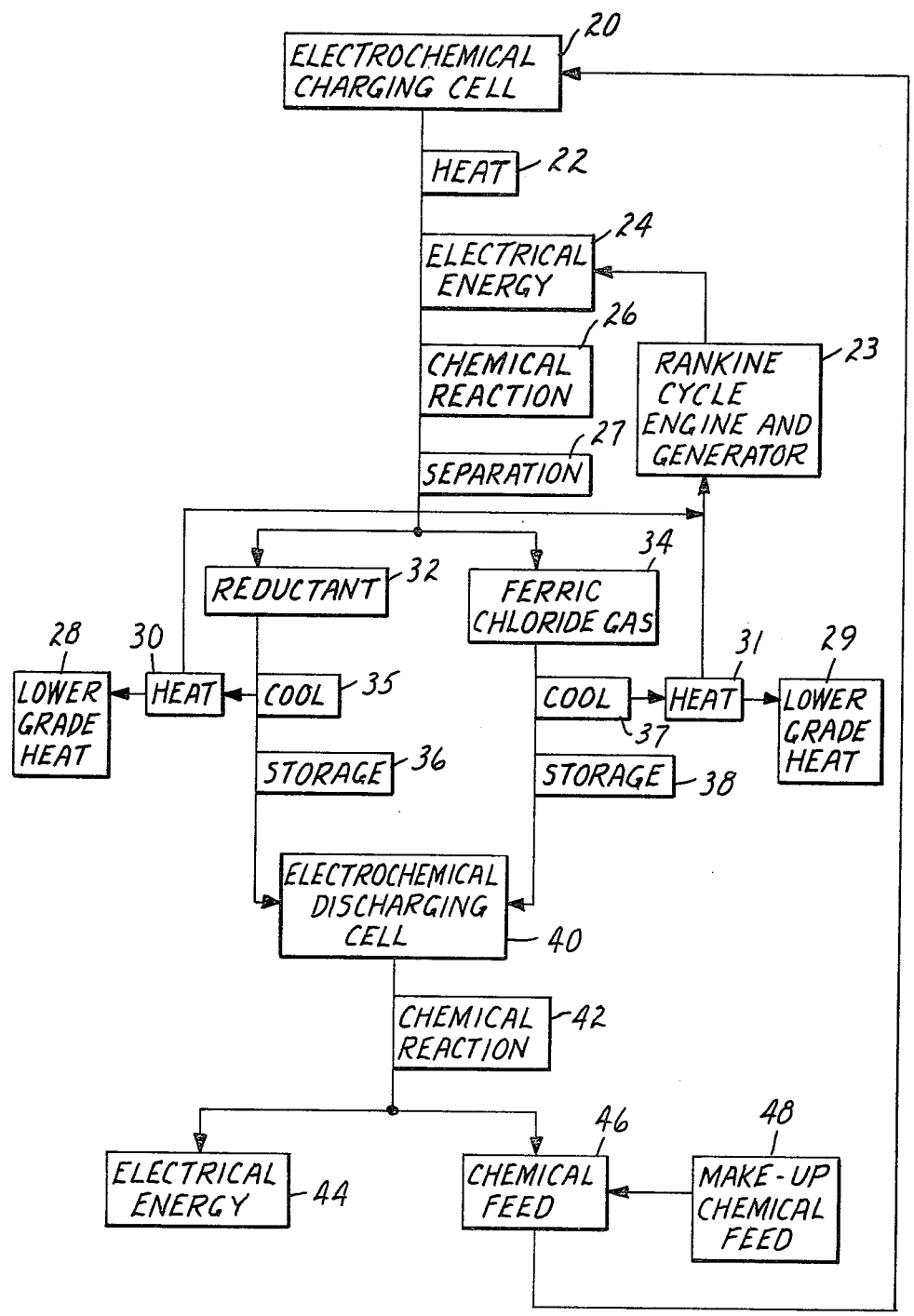
FIG. 1 is a schematic flow diagram illustrating steps of this invention.

Referring to FIG. 1, either $FeCl_2$ or a mixture of $FeCl_2$ and other chloride salts are fed as feed into a reaction chamber of electrochemical charging cell 20 where it is heated 22, e.g., by means of solar energy, to an appropriately high temperature (for example, 500° C. to 750° C.) such that the free energy necessary for causing a chemical charging reaction 26 [e.g., reaction equation (1) proceeding to the right] to take place is small. The supply of heat to the reaction chamber is continued as necessary to maintain, by use of a temperature sensing element, the desired high temperature and, if the free energy change is zero or positive, electrical energy 24 is applied across the electrodes of the cell 20. The chemical potentials for the reactant materials for a desired reaction temperature are maintained as near as possible to that of the pure reactant materials in their standard states in order to minimize the required electrical energy. When utilizing a charging temperature at or above the boiling point of $FeCl_2$ for reaction equation (1) no electrical potential and no electrodes may be needed in the charging step for reaction equations (2), (3), (5), (6) and (7), for charging temperatures above about 600° C. Electrical potential is supplied to the cell and consumed therein when it is operated between 316° C. and 1024° C. at about one atmosphere of pressure.

The products of chemical reaction 26 (viz., reductant and $FeCl_3(g)$) are separated 27 by means relying on their different states or magnetic properties, each separated product being then cooled and stored, the high grade heat 30, 31 (i.e., 100° C. or above) from cooling being converted to electrical energy 24 in a Rankine cycle heat engine and electrical generator 23. The electrical energy 24 is then utilized to help charge the system. Alternatively, the cooled separated ferric chloride gas and reductant product can be conveyed directly to discharging cell 40. Lower grade energy heat 28, 29 is available for other purposes. Lower grade heat as used herein refers to heat below 100° C. which is useful for space heating and hot water heating but is not useful in the electrochemical charging cell 20. During the course of the charging reaction, the products of the reaction are continuously generated, separated, and cooled, and stored or recombined.

The products 32, 34 are cooled 35, 37 and may be sent to storage 36, 38 or conveyed to and reacted in an electrochemical discharging cell 40 at a lower temperature of 350° C. or below. The chemical reaction 42 (e.g., reaction (1) proceeding to the left) takes place accompanied by the release of electrical energy 44. The $FeCl_2$-enriched product stream of this electrochemical reaction, the chemical feed 46, is recycled to cell 20, as described below (e.g., in FIG. 5) providing a closed loop process. The process is closed to the atmosphere and preferably there is no material loss. If it is desirable to add chemical feed, this may be accomplished by the introduction of make-up feed 48 into the chemical feed 46 or into the charging cell 20.

The equation for the basic cell reaction of reaction (1) is:

$$3 FeCl_2(FS) \rightleftharpoons Fe(s) + 2 FeCl_3(FS). \qquad \text{I}$$

Overall reaction (I) can be broken down into half cell reactions taking place at the anode and cathode:

Anode (i.e., negative electrode) reaction—

$$Fe^{2+}(FS) + 2e^- \rightleftharpoons Fe(s) \qquad \text{I(a)}$$

Cathode (i.e., positive electrode) reaction—

$$3 FeCl_2(FS) \rightleftharpoons Fe^{2+}(FS) + 2 FeCl_3(FS) + 2e^- \qquad \text{I(b)}$$

where $Fe^{2+}(FS)$ is a ferrous ion in the fused chloride electrolyte and $e^-$ is an electron. These two half cell reactions are based on the assumption that $Fe^{2+}$ ions carry most of the electrical current through the charging cell. If this is not the case, the half cell reactions will have to be written differently but overall reaction (I) will be the same.

In this invention the anode, which is also called the "negative electrode", is defined to be that electrode which takes up electrons from the external electrical circuit during charging of the electrochemical cell and gives up electrons to the external circuit during discharging of the cell. It follows then that the cathode, which is also called the "positive electrode", gives up electrons to and takes up electrons from the external electrical circuit during charging and discharging of the cell, respectively. This definition of anode and cathode is consistent with that given in the American Institute of Physics Handbook, 2nd Edition, pp. 5–262 (1963).

The voltage of an electrochemical cell is given by:

$$23058 \, nV_{oc} = \Delta H - T\Delta S \qquad \text{II}$$

where $V_{oc}$ is open circuit cell voltage in volts;
n is number of electrons transferred in the cell reaction;
$\Delta H$ is the heat of reaction during charging for the electrochemical cell reaction in calories;
$\Delta S$ is the entropy of reaction during charging for the electrochemical cell reaction in calories/°K;
T is the absolute temperature in °K; and 23058 $dV_{oc}/dT$ is approximately equal to $-\Delta S/n$ (assuming $\Delta H$ and $\Delta S$ do not vary much with temperature, e.g., $\Delta H$ does not vary by more than ±3% and $\Delta S$ does not vary by more than ±5%).

A measure of the thermal chargeability of an electrochemical cell in this invention is $-dV_{oc}/dT$. Chargeability as used herein refers to the decrease in the electrical energy required to make the charging reaction take place as the temperature increases. If decrease in the electrical energy required is large as the temperature increases, the cell has good chargeability. For good chargeability due to absorption of heat at elevated temperature, $-dV_{oc}/dT$ should be large and positive, and hence, an electrochemical cell reaction is desired with a large positive entropy of reaction for the charging reaction per Faraday of charge transferred in the cell reaction.

During charging, the above two half cell reactions (I)(a) and (I)(b) proceed to the right, and during discharging proceed to the left. The melting point of $FeCl_2$ is 677° C. whereas the melting point and boiling point of $FeCl_3$ are about 303° C. and 316° C., respectively. Thus, a fused salt chloride solvent may be used with a long liquid range, such as $NaAlCl_4$, which melts at about 151° C. and has a partial pressure of $AlCl_3$ of about 0.05 atmosphere at 600° C. For reaction (I), the open circuit cell voltage ($V_{oc}$) is given by:

$$23058 V_{oc} = 28270 - 2.158T + RT[\ln(FeCl_3) - 1.5 \ln(FeCl_2)] \qquad \text{III}$$

where $V_{oc}$ and T are as defined above and R is the Boltzman gas constant having the value 1.987 cal/°K mol and where $(FeCl_3)$ and $(FeCl_2)$ are the mole fractions of $FeCl_3$ and $FeCl_2$, respectively, in the fused chloride solutions in the cell. $FeCl_3$ is present only in the cathode half cell. $FeCl_2$ is present in both half cells in about equal mole fractions. In equation III for $V_{oc}$, the rigorous expression has the corresponding thermodynamic activities of $FeCl_3$ and $FeCl_2$ in place of mole fractions. Use of mole fractions does not introduce much error in the above case since to a good approximation thermodynamic activity is equal to the corresponding mole fraction for $FeCl_3$ and $FeCl_2$, respectively, for the above fused chloride solutions based on the remaining constituent being $NaAlCl_4$. At constant composition of the two solutions [e.g., $(FeCl_3) = 0.09$, $(FeCl_2) = 0.20$], $-dV_{oc}/dT = 2.158/23058 \times 100 = 0.0094$ volt/100° C., approximately. Thus, the thermal chargeability of such a cell is low.

At constant composition, the reaction of equation (I) would not be very suitable for converting thermal energy into electrochemical energy. However, if the reaction is carried out under the condition that both half cell solutions are always nearly saturated with respect to solid $FeCl_2$ and the cathode (i.e., positive electrode) half cell solution is always nearly saturated with respect to $FeCl_3$ (i.e., mixture of $FeCl_3$ and $Fe_2Cl_6$) gas at a constant partial pressure of about 1 atmosphere, then it can be written as:

$$3FeCl_2(s) \rightleftharpoons Fe(s) + 2FeCl_3(g) \qquad \text{reaction (4)}$$

and the concentration terms vanish in the expression for open circuit cell voltage $V_{oc}$. Moreover, $\Delta H$ and $\Delta S$ are respectively increased by two times the heat and two times the entropy of vaporization of liquid $FeCl_3$ plus three times the corresponding heat and three times the entropy of fusion of $FeCl_2$.

It is very pertinent to this invention that charging (i.e., reactions proceeding to the right) at elevated temperature is facilitated by the vaporization of $FeCl_3$ due to its relatively low normal boiling point of about 316° C. All of the electrochemical reactions of this invention involve the formation of $FeCl_3$ gas, as the oxidant product, during electrochemical cell charging which may be used to convert thermal energy into long-term storable and readily utilizable electrochemical energy.

Under the conditions of saturation described above, it has been observed experimentally from steady state charging experiments that $23058V_{oc} = 67066 - 53.058T$ and $-dV_{oc}/dT = 0.230$ volt/100° C. This corresponds to an unexpected factor of 24.5 increase in the thermal chargeability of the corresponding electrochemical cell compared to the constant composition cell where $-dV_{oc}/dT = 0.0094$ volt/100° C.

These reactions in fused salts (i.e., chlorides) are important in order to have a sufficiently wide temperature range to yield good Carnot thermal/electrochemical energy conversion efficiency, $\eta_c$, expressed by:

$$\eta_c = (T_2 - T_1)/T_2 \qquad \text{IV}$$

wherein $T_2$ is the temperature in °K. of the charging reaction and $T_1$ is the temperature in °K. of the discharging reaction.

The charging reaction of this invention involves the materials undergoing a chemical reaction in the reaction chamber using heat (preferably, solar heat since it does not deplete energy resources) and advantageously only a small amount of electrical energy. This has been demonstrated in the laboratory, as will be described.

Figure 2:
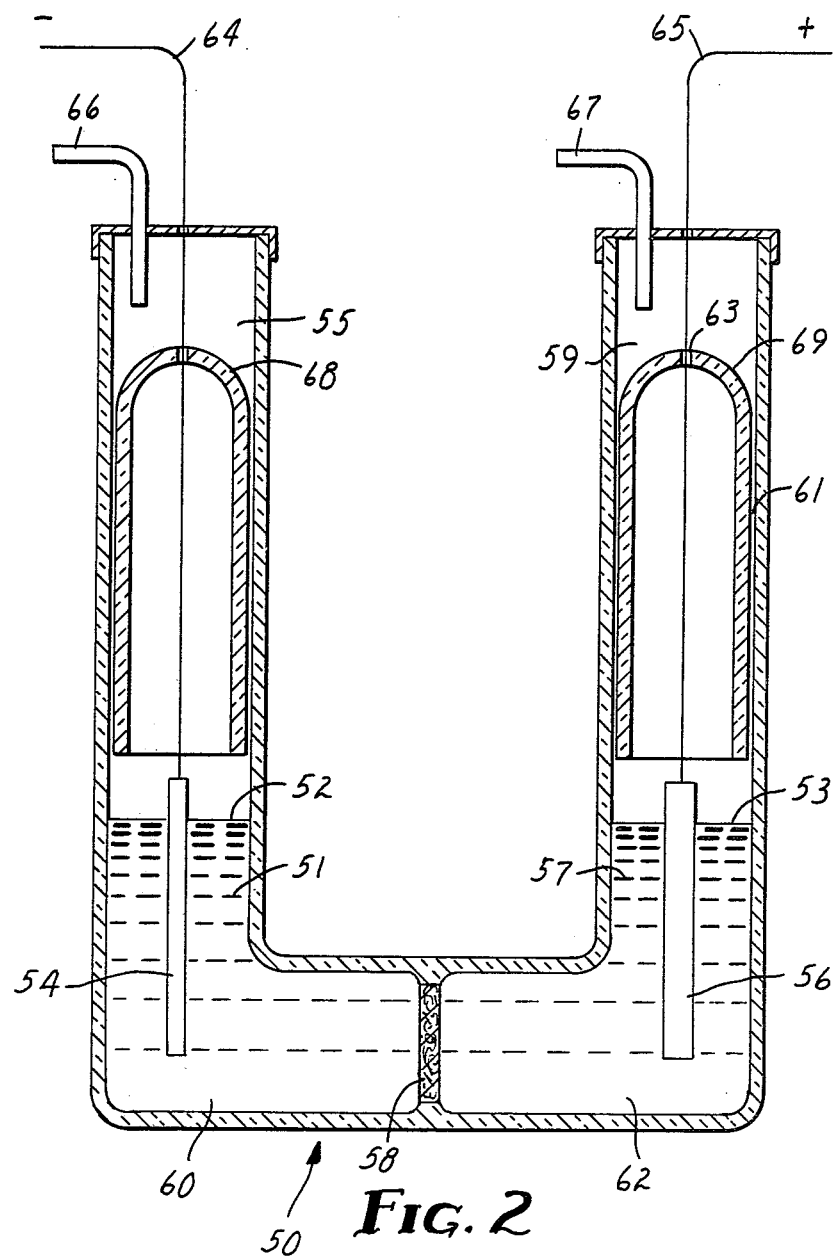
FIG. 2 is a vertical cross-section view of laboratory apparatus of a charging cell utilizing the reactions of this invention.

Referring to FIG. 2, a fused quartz cell 50 made from 3 cm I.D. quartz tubing served as the reaction chamber of a charging cell for runs involving reaction (4). In this cell the anode chamber 60 and cathode chamber 62 chambers were separated by a quartz frit separator 58 of 15 to 40 micron porosity to minimize migration of $FeCl_3$ from the cathode chamber melt or electrolyte 57 into the anode chamber melt or electrolyte 51 where it would react with iron deposited on the anode 54 and thus waste electrochemical energy. The anode 54 and the cathode 56 were connected to platinum leads 64, 65. The electrolyte surfaces 52, 53 were blanketed by a dry nitrogen gas atmosphere, admitted via quartz tubes 66, 67. Inner quartz domes 68, 69 were present in each arm of the apparatus.

The starting melt composition in this experiment was:

TABLE I

| Compound | Mole fraction of melt in each chamber |
|---|---|
| $FeCl_2$ | 0.250 |
| $AlCl_3$ | 0.250 |
| KCl | 0.140 |
| NaCl | 0.360 |

The cathode 56 was made of high density graphite with dimensions 6 cm long×2 cm wide×0.4 cm thick. The anode 54 was made from iron metal with dimensions 6 cm long×2 cm wide×0.051 cm thick. The electrical lead wires 64, 65 from the electrodes to the external electrical circuit were 0.020 inch (0.051 cm) diameter platinum. The volume of the fused salt chloride melt 51, 57 in each half cell (i.e., anode and cathode chambers) was about 70 cm³ and about 6 cm deep. The anode and cathode were about 11 cm apart. In operation, free Fe was deposited directly on the iron anode 54. The free Fe deposit was dendritic in nature perhaps due to absence of circulation of fused salt electrolyte 51 along the anode surface 54. Gaseous $FeCl_3$ diffuses through the small hole 63 in inverted dome 69 and through annular space 61 and condenses in the upper cathode chamber 59 of the cell. The purpose of inner quartz domes 68, 69 was to minimize loss of volatile material from the fused salt chloride melts 51, 57 and allow essentially steady state charging conditions to be achieved at constant charging electric current and constant applied charging voltage corresponding to a partial pressure of approximately 1 atmosphere $FeCl_3$ gas in the cathode chamber. The upper anode and cathode chambers 55, 59 above the two domes were kept free of air and moisture by a blanketing flow of pure dry nitrogen gas at atmospheric pressure which entered the cell through quartz tubes 66, 67. The cell temperature during charging and voltage measurement was 354° C.

During the early stages of charging, before steady state conditions were achieved, the $FeCl_3$ gas generated in the cathode chamber 62 gradually forced the nitrogen gas up through the small opening at the top of the dome until the $FeCl_3$ partial pressure approached atmospheric pressure. To achieve near steady state charging conditions, charging times of 15 to 20 hours at a chaging current of about 100 ma was used. Under these conditions, an open circuit cell voltage of 1.280 volts was obtained at near steady state charging.

A second charging of a cell as described above was carried out, with the exception that the cell temperature was held at 531° C. Under these conditions, an open circuit cell voltage of 0.850 volts was obtained at near steady state charging. Therefore, it can be seen that the required charging voltage decreases by 0.43 volts at this 177° C. higher temperature. This represents an average of about a 0.23 volt charging voltage decrease for every 100° C. increase in temperature which decrease applies throughout the approximate temperature range of 316° C. to 750° C. The difference in charging voltage required between low and high temperatures represents heat which is converted into electrochemical energy which can be stored. It is energy efficient to use higher cell charging temperatures (derived, preferably, from solar heat) and lower charging voltages.

After steady state charging conditions were reached in each of the above two charging runs, a Hewlett-Packard 7034A X-Y recording was made of cell current versus applied voltage in the neighborhood of the steady state, open circuit cell voltage. These recordings revealed that the cell current both at 354° C. and 531° C. became ohmic (i.e., the current became directly proportional to the difference between the applied voltage and the open circuit cell voltage) at applied voltages very near the corresponding steady state, open circuit cell voltage. This means that the kinetics of the cell reactions at both the positive and negative electrodes are favorable for obtaining high efficiency for the conversion of stored electrochemical energy into electrical energy by the method of this invention. Hence, there is no overpotential problem using these materials.

In a series of three similar runs, utilizing a melt mixture of $FeCl_2$, $AlCl_3$ and NaCl in the charging cell and high density graphite for both anode and cathode, and different charging cell temperatures of 364° C., 447° C., and 548° C., the open circuit cell voltage data again demonstrated that there was achieved about 0.23 volt charging decrease for every 100° C. increase in temperature representing heat which was converted into stored electrochemical energy.

In further runs, utilizing a melt of a mixture of $FeCl_2$ and NaCl in the charging cell and cell temperatures of 433° C., 573° C., and 700° C., it was found again that there was about 0.23 volt charging decrease for every 100° C. increase in temperature, representing heat which was converted into stored electrochemical energy.

As described above, following separation of the products of the charging reaction, the products can be stored, as shown in FIG. 1. Referring to that figure, gaseous $FeCl_3$ product 34 and free iron reductant product 32 which are generated in the charging cell 20 can be conveniently stored at a lower temperature for any length of time. When it is desired to supply electrical energy 44 to an external circuit, the stored $FeCl_3$ 38 and free iron reductant 36 can be recombined in an electrochemical discharging cell 40 at an appropriate lower temperature where the free energy of the discharging reaction is a large negative value and where the chemical potentials of these reacting products (i.e., $FeCl_3$ and Fe) for the desired reaction temperature are maintained as near as possible to that of the pure materials in their standard states.

Figure 3:
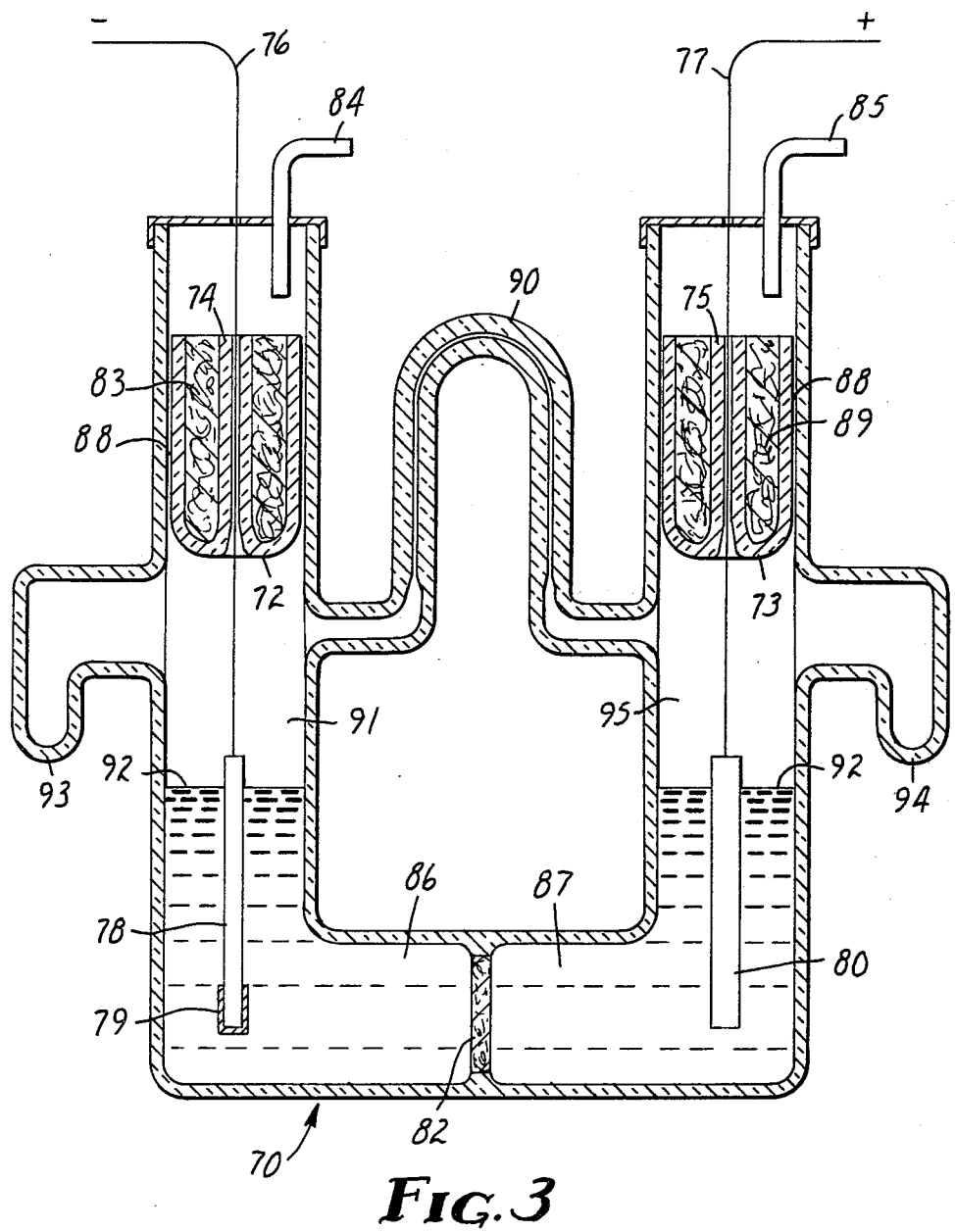
FIG. 3 is a vertical cross-section view of laboratory apparatus for charging and storing electrochemical energy utilizing the reactions of this invention.

Referring to FIG. 3 there is shown a fused quartz cell 70 having means for charging and storage of materials. The inverted domes 72, 73 had central quartz capillary tubes 74, 75 for the platinum lead wires 76, 77 from the electrodes (graphite anode 78, graphite cathode 80) to carry electric current to the external circuit. Quartz frit separator 82, and dry nitrogen blanketing gas which enters the cell through quartz tubes 84, 85, had the same functions as in FIG. 2. The spaces between the central capillary tubes 74, 75 and the dome walls were filled with quartz wool insulation 83, 89 to prevent thermal convection currents and help establish a steep negative temperature gradient upward along the domes so that condensation of $FeCl_3$ vapor did not take place on the bottom of dome 73 but condensed in the annular spaces 88 to seal them off and provide essentially a closed system. A bypass capillary tube 90 in the form of an inverted U connected the anode chamber 91 and cathode chamber 95 above the level 92 of the fused mixture and metal chloride electrolyte 86, 87. This bypass 90 served to prevent gas pressure differences from building up between the two half cells which would force liquid electrolyte through the quartz frit separator 82. The bypass capillary 90 was generally kept at about 400° C. to prevent $FeCl_3$ gas condensation in bypass capillary tube 90 but could be cooled to lower temperature if desired to allow $FeCl_3$ to condense and thus seal off the bypass 90.

Cathode reservoir 94 was used for $FeCl_3$ storage and anode reservoir 93 was available for Fe dendrite or other storage. Fe dendrides can be moved or separated by magnetic means. $FeCl_3$ gas entered cool storage reservoir 94 where it condensed to a solid.

The anode 78 was partially covered with an iron sheet 79 about 0.1 cm thick×2 cm wide×7 cm long weighing about 10 grams bent into a ⊔ shape and fitted tightly over the bottom portion of a 6 cm×2 cm×0.4 cm graphite electrode. The purpose of this iron cladding was to insure that iron metal would always be present on the anode 78 throughout each run. This ensures obtaining the true open circuit cell voltage for reaction (4). The cathode 80 consisted of a 6 cm×2 cm×0.4 cm high density graphite slab. The platinum lead wires 76, 77 were 0.020 inch (i.e., 0.051 cm) diameter wire.

The results for thermal to electrochemical energy conversion and storage are given below. The depth of the fused chloride electrolyte 86, 87 in each half cell was 5 to 6 cm with a volume of 60 to 65 cm³ at 300° C. The total amount of $FeCl_2$, $AlCl_3$ and $NaCl$ in each half cell was about 1.36 mole total. The starting composition of the chloride electrolyte mixture is shown below.

TABLE II

| Compound | (Grams Moles) Anode Chamber | Cathode Chamber |
|---|---|---|
| $FeCl_2$ | 0.461 | 0.576 |
| $AlCl_3$ | 0.361 | 0.313 |
| NaCl | 0.542 | 0.470 |

The charging conditions for the cell were:
Charging time (hours): 62.39
Average charging current (ma): 303
Average cell temperature (°C.): 600
Average internal cell resistance (ohms): 3.0

This charging amounted to a charge of 0.705 mole of electrons which was considered sufficient to oxidize all the 0.576 mole $FeCl_2$ in the cathode chamber to $FeCl_3$ and cause the open circuit cell voltage at the end of charging to be very high at 500° C. to 600° C. Chemical analysis at the end of the run revealed that the anode chamber electrolyte still contained about 0.154 mole fraction $FeCl_2$ and the cathode chamber electrolyte still contained about 0.033 mole fraction $FeCl_2$, apparently due to the fact that there was some migration of $FeCl_3$ from the cathode chamber 95 to the anode chamber 91 to react with Fe to form $FeCl_2$ during the charging operation.

The cathode reservoir 94 temperature was held at about 290° C. during charging so that the $FeCl_3$ vapor generated at the cathode 80 (positive electrode) condensed in the reservoir 94.

At the end of the charging treatment, the cathode reservoir 94 contained a large amount of reddish brown $FeCl_3$ condensate which was produced by the charging process. Thereafter, the cell was allowed to cool slowly on open circuit from 602° C. down to 330° C. and then heated back up again to 563° C. A record of time, cell temperature, cathode reservoir 94 temperature, bypass capillary tube 90 temperature and open circuit cell voltage during the cooling and heating cycle is tabulated below:

TABLE III

OPEN CIRCUIT CELL VOLTAGE DURING COOLING AND HEATING CYCLE

| Time (min.) | Cell melt temperature (°C.) | $FeCl_3$ reservoir temperature (°C.) | Open circuit cell voltage (Volts) | Capillary bypass temperature (°C.) |
|---|---|---|---|---|
| Start | 602 | 292 | 1.113 | 520 |
| 35 | 602 | 293 | 1.084 | 520 |
| 39 | 602 | 293 | 1.084 | 520 |
| 54 | 536 | 318 | 1.116 | 518 |
| 105 | 391 | 311 | 1.300 | 515 |
| 145 | 345 | 322 | 1.360 | 510 |
| 170 | 330 | 321 | 1.367 | 510 |
| 195 | 433 | 281 | 1.223 | 515 |
| 235 | 542 | 292 | 1.106 | 520 |
| 246 | 563 | 295 | 1.086 | 521 |

Visual inspection showed $FeCl_3$ to be present in the $FeCl_3$ reservoir 94 in the cathode half cell throughout the cooling and heating cycle since the $FeCl_3$ reservoir 94 was kept at 281° C. to 322° C. throughout the cycle. The partial pressure of $FeCl_3$ in the cathode half cell did not vary sufficiently to account for more than a 0.05 volt change in open circuit cell voltage. The open circuit cell voltage increased as the cell melt temperature decreased in the 600° C. to 300° C. range. This increase was due to vaporization of $FeCl_3$ from the $FeCl_3$ reservoir 94 into the cathode half cell melt when the melt temperature was decreased. This raised the concentration of the $FeCl_3$ in the cathode half cell melt and caused the cell voltage to increase. The reverse was observed when the cell melt was heated to high temperature. Open circuit cell voltage vs. cell melt temperature was continuously recorded throughout the heating and cooling cycle. The maximum negative slope (open circuit cell voltage vs. cell electrolyte temperature) occurred at cell melt temperature of about 475° C. From the value of the slope at this temperature the maximum observed rate of change of open circuit cell voltage with cell electrolyte temperature was $-dV_{oc}/dT=0.20$ volt/100° C.

Since the open circuit cell voltage vs. cell electrolyte temperature during the cooling and heating cycle was directly proportional to the free energy change for Reaction (4), it follows that the corresponding electrochemical cell as a result of electric charging and absorbing heat at about 600° C. gained electrochemical energy when the cell cooled from a cell electrolyte temperature of about 600° C. down to about 300° C. Some of the heat absorbed to help charge the cell at the higher temperature was converted into stored electrochemical energy at the lower temperature. This constituted conversion of thermal energy into stored electrochemical energy via reaction (4) in a type of electrochemical heat engine Carnot cycle. Energy storage was effected by the free Fe deposited on the anode 78 and the FeCl$_3$ vaporized into the FeCl$_3$ reservoir 94 attached to the cathode half cell during charging via reaction (4).

Additional runs utilizing the apparatus of FIG. 3 were conducted except that the starting composition of the chloride electrolyte mixture 86, 87 in both half cells contained FeCl$_2$, AlCl$_3$ and NaCl, in approximately equimolar amounts, and the cathode reservoir 94 temperature was held at about 210° C. during charging to facilitate the FeCl$_3$ condensation. Also, the amount of charging per mole of initial FeCl$_2$ in the cathode chamber was decreased about 40% from that of the preceding run, to insure that FeCl$_2$ was not totally used up. The same general behavior for open circuit cell voltage vs. cell electrolyte temperature during a cooling and heating cycle was found as described above using the apparatus of FIG. 3. Also, the maximum rate of change of open circuit cell voltage with respect to cell electrolyte temperature was about $-dV_{oc}/dT=0.21$ volt/100° C., which was in agreement with the 0.20 volt/100° C. value of the above described work with the same apparatus.

In the foregoing runs it was demonstrated that reaction (4), 3 FeCl$_2$(s)⇌Fe(s)+2 FeCl$_3$(g), could be driven to the right (i.e., charging) in an electrochemical cell by absorption of heat and expenditure of electrical energy so as to store electrochemical energy in the form of Fe and 2 FeCl$_3$ for prolonged periods of time. It was also demonstrated that at higher temperatures less electrical energy was required. Based on these observations and associated thermodynamic calculations, it is concluded that at higher temperatures more heat is absorbed and less electrical energy is expended to produce and store a given amount of electrochemical energy by reaction (4) proceeding to the right than at lower temperatures. Furthermore, it is concluded that the stored products (Fe and 2 FeCl$_3$) can be recombined via reaction (4) proceeding spontaneously to the left (i.e., discharging) in the appropriate electrochemical cell at lower temperature to generate more electrical energy than was expended in producing the stored products (Fe and 2 FeCl$_3$) at higher temperature. Thus net electrical energy is produced from the heat absorbed at the higher temperature. This is exemplified using the double cell apparatus of FIG. 4. The details of these runs utilizing this apparatus are as follows. The overall dimensions of the double cell were 33 cm wide and 39.6 cm high. The main cell portion of the double cell was made from 3 cm inside diameter (I.D.) fused quartz tubing having walls about 0.2 cm thick.

Cell A 96 is arranged on the left and Cell B 98 on the right. The cathode (i.e., positive electrode) half cells 99, 100 of Cell A and Cell B are connected by a 3 cm I.D. quartz 102 tube as shown so that FeCl$_3$ gas (g) can be distilled from one cathode half cell fused chloride electrolyte 104 to the other via this connecting tube. 105, 106 are high density graphite anodes (i.e., negative electrodes) 6 cm long×2 cm wide×0.4 cm thick. 107, 108 are vitreous carbon cathodes (i.e., positive electrodes) made from one-half of a high temperature reaction vitreous carbon boat sawed in half normal to its long direction to form a half cylinder about 8 cm long×2.3 cm diameter and wall thickness about 0.1 cm. The graphite anodes 105, 106 are connected to the external electrical circuit via about 0.051 cm diameter platinum (Pt) lead wires 109, 110 (enclosed in quartz capillary tubes 111, 112) and the vitreous carbon cathodes 107, 108 are connected to the external electrical circuit via about 0.10 cm diameter gold (Au) lead wires 113, 114 (enclosed in quartz capillary tubes 115, 116).

Initially, the fused chloride electrolyte 104 consisted of about 0.489 moles (i.e., 62 grams) of FeCl$_2$, 0.353 moles of AlCl$_3$ and 0.353 moles of NaCl of volume about 70 cm$^3$ to 75 cm$^3$ in each of the four half cells. The 0.353 mole of AlCl$_3$ and 0.353 mole of NaCl combine chemically on heating to about 170° C. to form 0.353 mole of NaAlCl$_4$ fused salt electrolyte which has a melting point of about 151° C. 118 shows the approximate location of the top surface of the fused chloride electrolyte in each half cell at 300° C. to 400° C. The maximum depth of the fused chloride electrolyte 104 was about 8.5 cm in each half cell. Thermodynamic calculations based on solubility measurements show that 0.353 mole of fused NaAlCl$_4$ electrolyte will dissolve about 0.011 mole of FeCl$_2$ at 300° C. and about 0.105 mole of FeCl$_2$ at 600° C.

Figure 4:
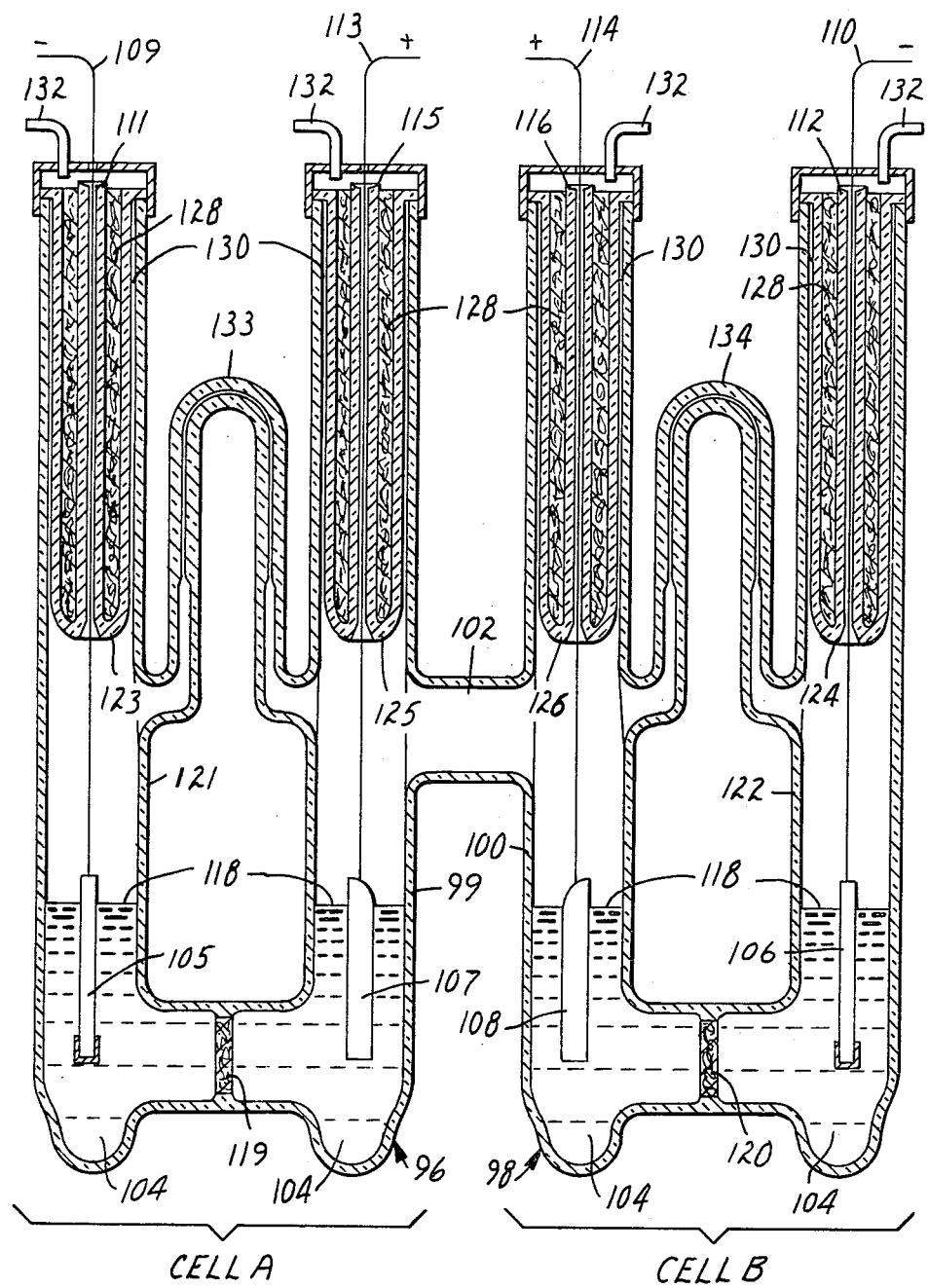
FIG. 4 is a vertical cross-section view of laboratory apparatus for conversion of thermal energy into stored electrochemical energy and then into electrical energy.

In FIG. 4, each cell has a fused quartz frit separator 119, 120 of 15 to 40 micron porosity separating the anode half cells 121, 122 from the cathode half cells 99, 100 of both Cell A 96 and Cell B 98 to minimize the migration of FeCl$_3$ from the cathode half cells 99, 100 into the anode half cells 121, 122 where it can react with the Fe metal on the anodes 105, 106 and waste electrochemical energy. Four inverted fused quartz domes 123, 124 and 125, 126 with central quartz capillary tubes 111, 112 and 115, 116, respectively (bore size 0.15 cm diameter), are shown. The space between the capillary tube and dome wall was packed with quartz wool 128 for thermal insulation. One of these domes was inserted in each of the upper extensions of the four half cells 99, 100, 121, 122 to provide a means for quasi-sealing the overall cell from the surrounding air atmosphere. This is augmented by the condensation of a small amount of FeCl$_3$ vapor in the annular spaces 130. Each dome is blanketed with N$_2$ gas admitted via quartz tubes 132. Bypass quartz capillary tubes 133, 134 connect the anode half cells 121, 122 to the cathode half cells 99, 100 in Cell A and Cell B. Their purpose is the same as that described in the exemplary work using the apparatus of FIG. 3.

The analysis of the significant results of this example makes use of symbols which have the following meanings:

V denotes applied charging voltage
$V_{oc}$ denotes open circuit cell voltage
$I_c$ denotes cell electric current
(A) refers to Cell A
(B) refers to Cell B Hence, V(A) is the applied charging voltage to Cell A, $I_c(A)$ is electric current passing through Cell A and $V_{oc}(A)$ is the open circuit voltage generated by Cell A.

$T_A$ and $T_B$ denote temperatures of fused chloride electrolyte in Cell A and Cell B, respectively $R_A$ and $R_B$ denote internal cell resistances +1 ohm external circuit resistance for Cell A and Cell B, respectively Initially, Cell B was charge overnight for 21.81 hours at an average cell current of 294 milliamperes (ma). During this charging of Cell B at temperature $T_B=563°$ C., Cell A was kept on open circuit at temperature $T_A 312°$ C. The initial open circuit cell voltages were $V_{oc}(A)=0.803$ volt and $V_{oc}(B)=0.759$ volt for Cell A and Cell B, respectively. The final open circuit cell voltages after charging Cell B for 21.81 hours at $T_B=563°$ C. were $V_{oc}(A)=1.508$ volts and $V_{oc}(B)=1.133$ volt for Cell A and Cell B, respectively. The internal cell resistance for Cell B at the stat of this charging process was 3.87 ohms (i.e., $R_A=4.87$ ohms).

A Varian Associates G10 Graphic Recorder was used to record Cell B electrical current $I_c(B)$ vs. time throughout the charging of Cell B and a second identical-make recorder was used to record Cell A open circuit cell voltage $V_{oc}(A)$ vs. time simultaneously. For a charging voltage ranging from 2.40 to 2.50 volts applied to Cell B, the cell current remained fairly constant at about 300 ma but began to drift down slowly due to an estimated increase of 0.144 volt in the open circuit cell voltage $V_{oc}(B)$ of Cell B during the first several hours of charging. On the other hand, the open circuit cell voltage $V_{oc}(A)$ of Cell A began to rapidly increase by 0.487 volt during this same period. This behavior is as expected and is due to the fact that most of the $FeCl_3$ generated at the cathode 108 of Cell B at $T_B=563°$ C. during the charging of Cell B is vaporized over into the cathode chamber 99 of Cell A where it condenses in the fused chloride electrolyte due to the lower temperature of Cell A (i.e., $T_A=312°$ C.). Thus, the $FeCl_3$ concentration in the cathode chamber fused chloride electrolyte 104 in Cell A increases much faster than that in cathode chamber fused chloride electrolyte in Cell B even though Cell B is being electrically charged and Cell A is not. This causes $V_{oc}(A)$ to increase much more than $V_{oc}(B)$. It should be noted that both graphite anodes 105, 106 have a sheet iron cladding attached to them similar to those used with the apparatus of FIG. 3. Thus, iron was present on the Cell A anode 105 for this charging run on Cell B even though Cell A had not been charged at all at this point. This means that $V_{oc}(A)$ is representative of reaction (4) in Cell A at 312° C. but at a partial pressure of $FeCl_3$ vapor increasing toward 1 atmosphere, rather than equal to 1 atmosphere. Both solid Fe metal and solid $FeCl_2$ were present as required by Reaction (4).

Nine charging runs were made on either Cell A or Cell B at elevated temperature (i.e., 505° C. to 616° C.). In each case the cell not being charged was maintained at a cell temperature of 312° C. or less. This was done to facilitate transfer, via the vapor phase of the $FeCl_3$, generated in the higher temperature cathode half cell, into solution in the fused chloride electrolyte in the cathode chamber of the lower temperature cell. Run 1 was described above. The initial and final open circuit cell voltage $V_{oc}(A)$ for Cell A and $V_{oc}(B)$ for Cell B were tabulated at the start and at the end of each of the charging runs and down in tabular form as follows:

TABLE IV

| Run No. | Time of Charging (Hours) | Cell Charged (A or B) | Charge Stored (Coulombs) | $T_A$ (°C.) | $T_B$ (°C.) | At Start $V_{oc}(A)$ (Volts) | At Start $V_{oc}(B)$ (Volts) | At End $V_{oc}(A)$ (Volts) | At End $V_{oc}(B)$ (Volts) |
|---|---|---|---|---|---|---|---|---|---|
| 1 | 21.81 | B | 23077 | 312 | 563 | .803 | .759 | 1.508 | 1.133 |
| 2 | 2.08 | B | 1993 | 261 | 567 | 1.566 | 1.174 | 1.590 | 1.395 |
| 3 | 1.78 | A | 2019 | 597.5 | 298 | 1.034 | 1.579 | 1.080 | 1.592 |
| 5 | 6.25 | A | 6300 | 505 | 252 | 1.066 | 1.572 | 1.508 | 1.610 |
| 6 | 18.87 | A | 14950 | 505 | 240 | 1.060 | 1.636 | 1.450 | 1.669 |
| 8 | 17.42 | B | 21872 | 264 | 600 | 1.595 | 1.162 | 1.474 | 1.250 |
| 10 | 0.75 | B | 1620 | 293.5 | 615 | 1.338 | 1.17 | 1.344 | 1.212 |
| 11 | 15.30 | B | 15566 | 294.5 | 616 | 1.384 | 1.030 | 1.572 | 1.280 |
| 13 | 19.93 | A | 20494 | 606.5 | 304.5 | .980 | 1.550 | 1.195 | 1.628 |

These charging runs were cumulative because no discharging was done between successive runs. The values of the open circuit cell voltages in the above table clearly show that the $FeCl_3$ generated at the cathode of one cell during charging at elevated temperature migrates as ferric chloride gas over into the cathode chamber of a lower temperature cell where it condenses in the electrolyte and generates a higher open circuit voltage than that of the higher temperature cell being charged. This constitutes electrochemical energy transfer and storage as well as conversion of heat to electrochemical energy.

Again, using the apparatus of FIG. 4, the conversion of electrochemical energy into electrical energy was accomplished, as well as direct conversion of heat into electrical energy with a low temperature cell putting out greater voltage than the high temperature cell. That is, surplus energy is available by charging at high temperature and discharging at low temperature. For this exemplary work Cell A and Cell B were electrically connected in parallel, that is, the EMF of Cell A opposes the EMF of Cell B, such that Cell A cathode 107 was connected electrically to Cell B cathode 108 via the gold lead wires 113, 114 and Cell A anode 105 was connected electrically to Cell B anode 106 via an external circuit of one ohm resistance and the two corresponding platinum lead wires 109, 110 from the two anodes. In this arrangement, Cell B at a temperature $T_B=299°$ C. had an open circuit cell voltage of 1.592 volts as measured by a Keithley 6165 Digital Electrometer and Cell A at a temperature of $T_A=597°$ C. had an open circuit cell voltage of 1.072 volts after Cell A had been charged with 2019 coulombs and Cell B had been charged with 25070 coulombs. When the switch to the external electrical circuit was closed, Cell B started to discharge because of its larger cell voltage and started driving a charging current $I_c(A)$ through Cell A. In this case electrons flowed from the anode of Cell B 106 through the external circuit to the anode of Cell A 105. This current which was also equal to $-I_c(B)$, the discharging current in Cell B, was measured in the external electrical circuit by measuring the voltage drop across a 1.00 ohm resistor with a Keithley 155 Null Detector Microvoltmeter. The total circuit resistance was the sum of this 1.00 ohm resistor and the internal resistances of Cell A and Cell B. The driving force for the electrical current $I_c(A) = -I_c(B)$ in the electrical circuit was $V_{oc}(B) - V_{oc}(A)$, the difference in the open circuit cell voltages of Cell B and Cell A. While the current $I_c(A)$ was flowing, excess thermal energy was absorbed in Cell A at about 595° C. over that emitted in Cell B at about 299° C. during charging and discharging, respectively, and this excess thermal energy was converted into electrical energy in the electrical circuit consisting of Cell A and Cell B and circuit elements external thereto. The rate of electrical energy generated by the excess heat absorbed in Cell A over that emitted in Cell B was equal to the product $[I_c(A)] \times [V_{oc}(B) - V_{oc}(A)]$.

This thermal/electrical energy conversion was continued for 83 minutes. During this 83 minute period, Cell A had an average open circuit cell voltage of $V_{oc}(A) = 1.039$ volts at an average fused chloride electrolyte temperature in Cell A of $T_A = 595°$ C. and Cell B had an average open circuit cell voltage of $V_{oc}(B) = 1.585$ volts at an average fused chloride electrolyte temperature in Cell B of $T_B = 299°$ C. Thus, the average driving potential created by the absorption of heat of $T_A = 595°$ C. was $1.585 - 1.039 = 0.546$ volt for the cell circuit. The overall cell circuit resistance R was 12.24 ohms initially and 14.37 ohms at the end. All but 1 ohm of this resistance was due to the internal resistances of Cell A and Cell B. The internal resistance of Cell A was about 4 ohms and Cell B ranged from 7 to 9 ohms. The thermally generated electric current $I_c(A)$ averaged about 41 ma throughout the 83 minute period. This constitutes a demonstration of the conversion of thermal energy into electrical energy by this invention via reaction (4) in an electrochemical Carnot-type heat cycle.

Further exemplary work was completed using the same materials as those just described, and the same apparatus and similar procedure except that further charging had been carried out for both Cell A and Cell B. In this example, Cell A had been charged with a total of 43763 coulombs of electrical charge and Cell B had been charged with 64128 coulombs. This corresponds to 0.454 moles of electron charge for Cell A and 0.665 moles of electron charge for Cell B. This is sufficient charge to oxidize all the 0.489 mole of $FeCl_2$ in the cathode chamber 100 of Cell B to $FeCl_3$. However, since the open circuit cell voltage $V_{oc}(B)$ of Cell B remained essentially constant at about 1.6 volts at 299° C. to 309° C. over a period of 42.8 hours, it appears that sufficient $FeCl_3$ had migrated from the cathode chamber 100 of Cell B to react with Fe in the anode chamber 122 of Cell B to maintain at least a small concentration of $FeCl_2$ in the electrolyte 104 (only about 0.011 mole of $FeCl_2$ would have been required for saturation at 300° C.) in both chambers of Cell B. This was to be expected from having observed a similar situation in the example utilizing the apparatus of FIG. 3.

Cell A and Cell B were electrically connected in the same parallel arrangement as described above. Initially, Cell A had an open circuit cell voltage $V_{oc}(A) = 1.012$ volts at temperature $T_A = 608°$ C. and Cell B had an open circuit cell voltage $V_{oc}(B) = 1.627$ volts at temperature $T_B = 309°$ C. The initial current in the external circuit after the switch to the external circuit was closed was 17.2 ma under a cell opposing potential difference of $V_{oc}(B) - V_{oc}(A) = 0.615$ volt, and hence, the overall cell circuit resistance was 35.76 ohms. This total resistance includes 1 ohm resistance in the external circuit, about 3.33 ohms internal cell resistance in Cell A, and about 31.43 ohms internal cell resistance in Cell B. It had been found earlier that when Cell B was heated to 616° C., the internal cell resistance dropped to about 1.94 ohms. When first cooled from 616° C., the approximate internal Cell B resistance was 3.43 ohms at 426° C., 5.55 ohms at 342° C., and 7.54 ohms at 299° C. On prolonged standing at about 300° C., the internal Cell B resistance increased slowly up to greater than 30 ohms. This increase is thought to be due to precipitation of $FeCl_2$ in the pores of the quartz frit separator 120 between the anode and cathode half cells of Cell B at cell temperature $T_B$ of about 300° C. Similar behavior was observed for Cell A. This problem may have been caused by the quartz frit separators being at a slightly lower temperature than the electrolyte in the neighborhood of the electrodes in the Cell A and Cell B. It could also be caused by precipitation of some $FeCl_2$ on the anode and cathode of the cell during discharging at 300° C. or lower.

Electric current generation was continued for a total of 46.87 hours during which conversion of thermal energy to electrical energy via reaction (4) was clearly demonstrated again. A record was kept of time, Cell A open circuit cell voltage $V_{oc}(A)$, Cell A fused chloride electrolyte temperature $T_A$, Cell A internal resistance $R_i(A)$, Cell B open circuit cell voltage $V_{oc}(B)$, Cell B fused chloride electrolyte temperature $T_B$, Cell B internal resistance $R_i(B)$, and thermally generated electric current $I_c(A) = -I_c(B)$ in the overall cell circuit. This record is listed below. The thermally generated current $I_c(A)$ gradually decreased from the starting value of 17.2 milliamperes down to 10.0 milliamperes with Cell A temperature $T_A$ at 608° C. to 609° C. and Cell B temperature $T_B$ at 299° C. to 309° C. throughout this period of time. Since the thermally generated driving voltage $V_{oc}(B) - V_{oc}(A)$ only decreased from 0.615 volt to 0.578 volt during this period, the decrease in the thermally generated current is attributed to the increase in Cell B internal resistance from 31.45 ohms to 53.70 ohms in this period of time which is thought to be due to precipitation of $FeCl_2$ in the quartz frit separator 120 and perhaps on electrode surfaces.

TABLE V

| Elapsed Time (Hours) | $V_{oc}(A)$ (Volts) | $V_{oc}(B)$ (Volts) | Thermally Generated Current $I_c(A)$ (Milliamps) | $T_A$ (°C.) | $T_B$ (°C.) | $R_i(A)$ (ohms) | $R_i(B)$ (ohms) | Total Circuit R (ohms) |
|---|---|---|---|---|---|---|---|---|
| 0 | 1.012 | 1.627 | 17.2 | 608 | 309 | 3.31 | 31.55 | 35.76 |
| 24.95 | 1.022 | 1.610 | 13.3 | 608 | 300 | 2.86 | 40.35 | 44.21 |
| 40.93 | 1.013 | 1.591 | 10.0 | 609 | 300 | 3.10 | 53.70 | 57.80 |
| 42.83 | 1.106 | 1.597 | 8.4 | 499 | 299 | 5.83 | 51.62 | 58.45 |
| 44.45 | 1.310 | 1.605 | 4.7 | 389 | 300 | 15.74 | 46.03 | 62.77 |

TABLE V-continued

| Elapsed Time (Hours) | $V_{oc}(A)$ (Volts) | $V_{oc}(B)$ (Volts) | Thermally Generated Current $I_c(A)$ (Milliamps) | $T_A$ (°C.) | $T_B$ (°C.) | $R_i(A)$ (ohms) | $R_i(B)$ (ohms) | Total Circuit R (ohms) |
|---|---|---|---|---|---|---|---|---|
| 45.97 | 1.505 | 1.599 | 0.46 | 298 | 309 | 141.30 | 62.05 | 204.35 |
| 46.87 | 1.555 | 0.940 | −9.5 | 305 | 590 | 49.68 | 14.06 | 64.74 |

A continuous recording of $I_c(A)$ vs. time proved that the electrical current in the overall cell circuit was continuously generated via reaction (4) by absorption of heat in Cell A during the first 45.12 hours of the run.

The thermally generated current $I_c(A)$ was recorded continuously throughout the run of 47.03 hours duration. Cell A temperature was maintained at about 608° C. and Cell B temperature was maintained at about 300° C. during the first 41.65 hours. Then the temperature controller regulating Cell A temperature, $T_A$, was turned down to let $T_A$ decrease from about 608° C. to about 499° C., turned down again at 43.12 hours to let $T_A$ drop to 389° C., and turned down the final time at 44.67 hours to let $T_A$ level out at about 290° C. The temperature of Cell B, $T_B$, in the meantime was maintained at about 300° C.

Since the thermally generated current via reaction (4) is produced by absorption of heat in a temperature difference Carnot-type cycle, it was expected that as $T_A$ was decreased toward $T_B$, the thermally generated current $I_c(A)$ would decrease toward zero as would the thermally generated driving voltage $V_{oc}(B) - V_{oc}(A)$. This was verified by the data. When $T_A - T_B$ was 309° C. at 40.93 hours, $V_{oc}(B) - V_{oc}(A)$ was 0.578 volt and $I_c(A)$ was 10 milliamperes. When $T_A - T_B$ was 200° C. at 42.83 hours, $V_{oc}(B) - V_{oc}(A)$ was 0.491 volt and $I_c(A)$ was 8.4 ma. When $T_A - T_B$ was 89° C. at 44.45 hours, $V_{oc}(B) - V_{oc}(A)$ was 0.295 volt and $I_c(A)$ was 4.7 milliamperes. When $T_A$ and $T_B$ were within 11° C. of each other at 45.97 hours, $V_{oc}(B) - V_{oc}(A)$ was only 0.094 volt and $I_c(A)$ was about 0.5 ma. At 46.25 hours, Cell B temperature $T_B$ was increased rapidly while Cell A temperature $T_A$ was held relatively constant at about 300° C. Now the driving force $V_{oc}(B) - V_{oc}(A)$ became negative and the thermally generated current $I_c(A)$ reversed its direction in the overall cell circuit. At 46.87 hours when $T_A - T_B$ had become −285° C., $V_{oc}(B) - V_{oc}(A)$ was −0.615 volt and $I_c(A)$ was −9.5 milliamperes. These data are further confirmation of conversion of thermal energy to electrical energy via reaction (4) by a temperature difference Carnot-type process involving electrochemical cells.

In summary, the examples reported above utilizing reaction (4),

3 $FeCl_2(s) \rightleftharpoons Fe(s) + 2\ FeCl_3(g)$ demonstrate both the conversion of thermal energy to stored electrochemical energy and the conversion of thermal energy to electrical energy. This invention provides the basis for developing a practical process for converting solar energy into long-term storable and readily utilizable electrochemical energy via high grade thermal energy and electrochemical cells.

Below is described, with reference to FIGS. 5, 6, 7, 8, and 9, apparatus for one embodiment of the invention that represents a practical and economical process for converting solar energy first into the heat, then into stored electrochemical energy, and finally as needed into useful electrical energy. The heat required for producing stored electrochemical energy could also be obtained from other sources such as nuclear reactors and fossil fuel combustion, but the preferred source is solar energy.

The apparatus is closed to prevent air and moisture from getting in and to prevent the electrolyte materials from leaking out. The container materials for electrochemical cells, storage reservoirs, and connecting leads are of a suitable ceramic material such as aluminum oxide, mullite, or fused quartz. Seals and gaskets may be of graphite materials or a glass of boric oxide, aluminum oxide, and silicon dioxide with a softening point such that material would deform to the desired extent under pressure in the temperature range of the energy conversion process (i.e., 230° C. to 750° C.). The positive electrodes may be of vitreous carbon or other inert materials and the negative electrodes may be of the same materials or high density graphite.

Each cell has a separator or divider between the negative electrode chamber and the positive electrode chamber to minimize migration of electrolyte from one chamber into the other. It might be possible to reduce cell energy losses by a controlled net flow of electrolyte from the negative electrode through the separator toward the positive electrode. The separator material may be porous aluminum oxide, mullite, quartz, or other non-reactive ceramic material. In cells discharging in the lower temperature range of 200° C. to 350° C., the separator may also be made of a solid electrolyte such as sodium ion-conducting Beta-alumina in which case $NaAlCl_4$ is included in the cell electrolyte to provide $Na^+$ ions for carrying cell current through the separator. It is anticipated that a ferrous ion-conducting solid electrolyte would be useful.

This invention can be operated as a combination battery-fuel cell in which the iron deposited on the negative electrode during charging is stored within the cell whereas the ferric chloride gas generated simultaneously at the positive electrode is condensed and stored in a reservoir outside the charging cell. The description below is of a process for using the invention as a pure fuel cell in which both the iron and ferric chloride produced during charging are stored in separate reservoirs outside the charging cell.

In the description each individual cell has the general geometry at a right circular cylinder with the positive electrode chamber, cell separator, and the negative electrode chamber arranged concentrically. Other arrangements are possible.

Figure 5:
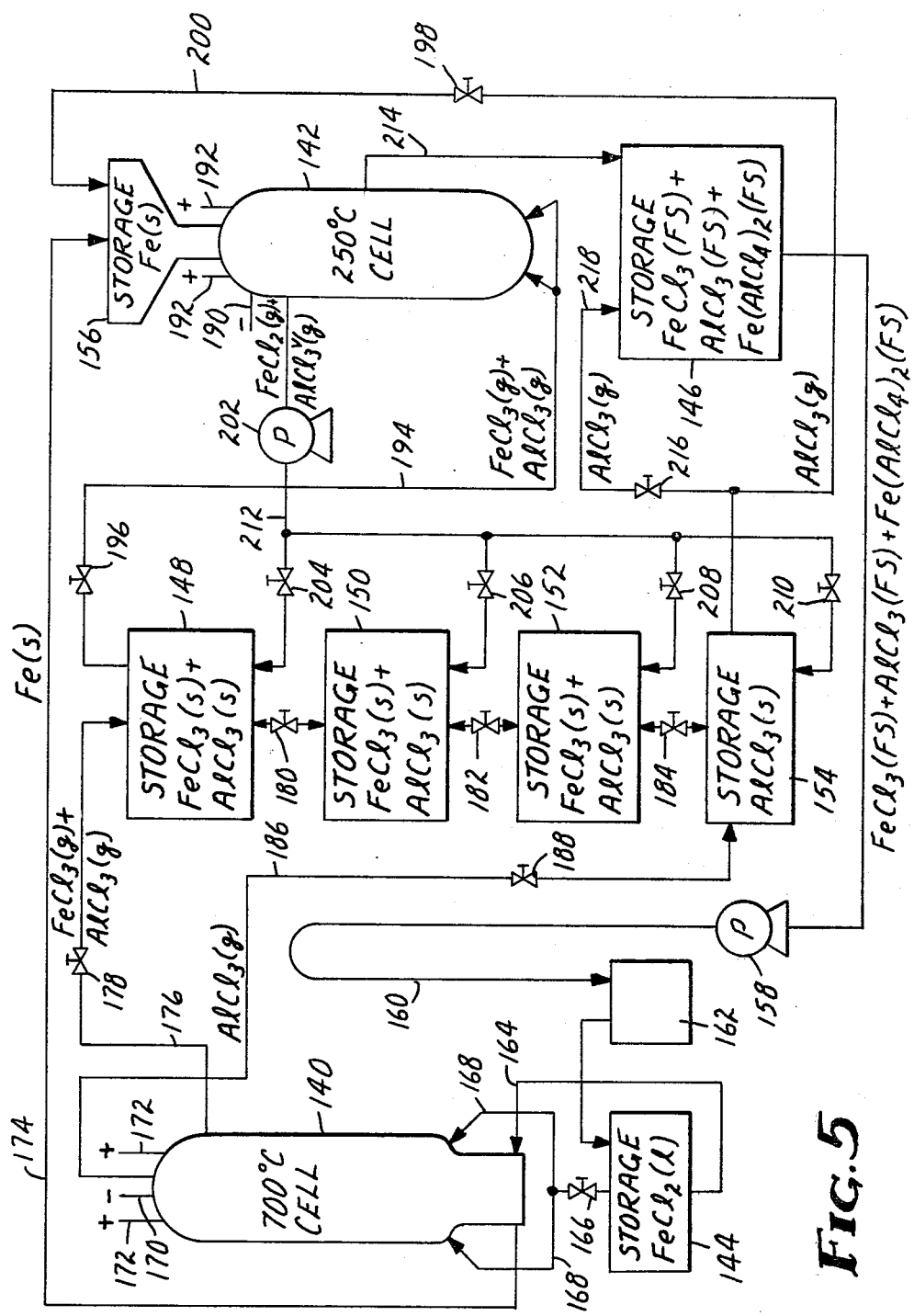
FIG. 5 is a flow sheet schematically illustrating an embodiment of the charging, storage and discharging aspects of this invention.

FIG. 5 represents a schematic diagram of the closed materials apparatus of the invention including a charging cell 140, a discharging cell 142, and material storage reservoirs 144, 146, 148, 150, 152, 154 and 156 for chemical feed, $FeCl_3$, and free iron.

A fused salt electrolyte mixture of $FeCl_3$, $AlCl_3$, and $Fe(AlCl_4)_2$ is transferred from storage reservoir 146 via pump 158 and line 160 through trap 162 into storage reservoir 144. Liquid reactant $FeCl_2$, stored in reservoir 144, enters charging cell 140 through line 164. Valve 166 controls the flow of gaseous $FeCl_3$-$AlCl_3$ through line 168 into cell 140.

The iron rod electrical lead 170 which is embedded in the graphite rod negative electrode in the center of charging cell 140 is hermetically sealed to charging cell 140. Positive iron rod leads 172 which are embedded in the graphite cylinder positive electrode are similarly hermetically sealed to charging cell 140.

The electrochemical charging reaction in cell 140 involves generation of $FeCl_3$ gas at the positive electrode and deposition of Fe dendrites on the negative electrode. The Fe dendrites are moved by means of an external magnetic field through quartz line 174 to storage reservoir 156. The $FeCl_3$ gas generated is moved, along with the $FeCl_3$-$AlCl_3$ gas mixture admitted to charging cell 140 through line 168, from charging cell 140 through fused quartz line 176 and valves 178, 180, 182 and 184 to storage reservoirs 148, 150, 152 and 154. $AlCl_3$ gas may be added or removed from the charging cell 140 by means of fused quartz line 186 and valve 188. Electrochemical energy can be generated as needed by recombining the stored fuel in electrochemical discharging cell 142. Fe dendrites are fed from storage reservoir 156 into the negative electrode chamber of discharging cell 142. Iron rod lead 190 to the graphite rod negative electrode of discharging cell 142 is hermetically sealed to the discharging cell. Iron rod leads 192 to the graphite cylinder position electrode similarly are hermetically sealed to discharging cell 142. $FeCl_3$-$AlCl_3$ gas enriched in $FeCl_3$ is introduced into the electrolyte in the positive electrode chamber of cell 142 by means of line 194 and valve 196. Addition or removal of $AlCl_3$ into or or out of the negative electrode chamber of cell 142 can be accomplished via valve 198 and line 200.

Circulating pump 202 recirculates effluent gas ($FeCl_3$ and $AlCl_3$) from above the electrolyte surface in the positive electrode chamber of cell 142 through line 212 to one or more of the fuel storage reservoirs 148, 150, 152 and 154 via valves 204, 206, 208 and 210.

The fused salt electrolyte from the positive electrode chamber in discharging cell 142 overflows into storage reservoir 146 via line 214. $AlCl_3$ gas is vaporized from storage reservoir 154 into the fused salt electrolyte in storage reservoir 146 via valve 216 and line 218.

Referring to FIG. 6 which represents a cross-section of charging cell 140 of FIG. 5, the positive graphite cylindrical electrode 220, the top of which is at 222, is embedded with four iron rod positive electrode leads 172 which are each hermetically sealed to quartz cell 140 by means of quartz-glass graded seals 226, glass-kovar seals 228, and kovar-iron rod solder seals 230.

Iron rod electrical lead 170 is in the center of the graphite rod negative electrode 234 and it is hermetically sealed to quartz cell 140 in the same manner as the positive electrode leads 172 described above. Negative graphite electrode 234 is supported on the bottom by fused quartz rod 236 which is sealed to the bottom of the cell. Negative electrode chamber 238 surrounds the graphite rod negative electrode 234. The iron rod electrical leads 170, 172 for both electrodes are protected by graphite sleeves 240 which extend into quartz lead tubes 242.

The electrodes are separated by means of a cylindrical porous quartz separator 244 which is attached by means of fused quartz seal 246 to fused quartz cylinder 248 which is sealed to cell 140 for support. Two quartz rods 250, which are able to turn axially around negative electrode 234, are sealed at the lower end to hollow quartz bulbs 252 in which is enclosed iron ball 254. The quartz bulbs 252 are connected dumbell-fashion to a quartz ring 256 supported concentrically around fused quartz rod 236. Quartz rods 250 are also attached at the top to quartz ring 258. Quartz line 174 enables Fe dendrites that are dislodged by quartz rods 250 and fall to the bottom of negative electrode chamber 238 to be moved by means of magnetic fields to a storage reservoir. Liquid $FeCl_2$ reactant enters cell 140 positive electrode chamber 262 through quartz line 164 in sufficient quantity to fill to desired level 266. Quartz lines 168 enable $FeCl_3$-$AlCl_3$ gas to enter the positive electrode chamber 262. A gaseous mixture of $FeCl_3$ and $AlCl_3$ is passed to storage via quartz line 176. Fused quartz line 186 provides a means for adding or removing $AlCl_3$ gas from negative electrode chamber 238.

Referring to FIG. 7. a cross-section of charging cell 140 on the line 7—7 of FIG. 6, electrical lead 170 is embedded in graphite rod negative electrode 234. Porous quartz separator 244 is located between negative electrode chamber 238 and positive electrode chamber 262. Embedded in positive graphite electrode 220 are four iron rod electrode leads 172. Two turntable quartz rods 250 are located in the negative electrode chamber 238.

Figures 8, 9:
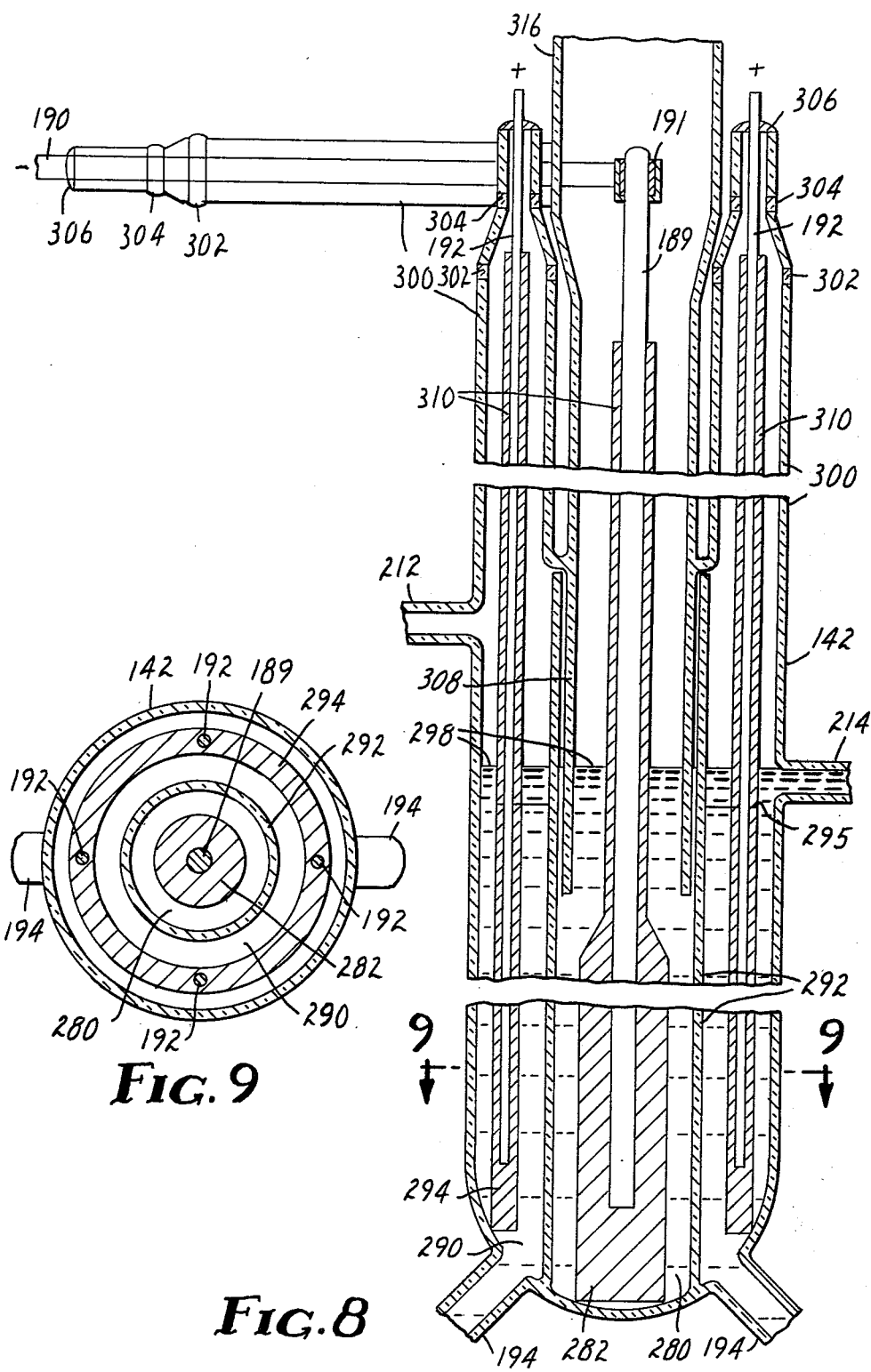
FIG. 8 is a vertical cross-section of a discharging cell in accordance with the invention.
FIG. 9 is a cross-section of FIG. 8 taken along the line 9—9.

Referring to FIG. 8 which represents a cross-section of discharging cell 142 of FIG. 5, negative electrode chamber 280 contains the negative electrode graphite rod 282 in which is embedded iron rod lead 189 to which iron rod lead 190 is electrically connected by right angled sleeve weld 191. Cylindrical positive electrode chamber 290 is separated from the negative electrode chamber by porous quartz separator 292. Embedded in graphite cylindrical positive electrode 294 are four iron rod leads 192. The top of positive electrode 294 is at 295. The level 298 of liquid electrolyte in negative electrode chamber 280 is adjusted by addition or removal of $AlCl_3$ gas from a storage reservoir via large quartz tube 316. Iron rod electrical leads 190 and 192 are hermetically sealed to cell 142 by quartz tube leads 300, fused quartz-glass graded seals 302, glass-kovar seals 304, and kovar-iron lead soldered joints 306. Fused quartz tube 308 provides a gas-tight barrier between chambers 280 and 290. The iron rod electrical leads for both electrodes are protected by graphite sleeves 310.

The composition of electrolyte mixture in the positive electrode chamber 290 is adjusted by controlling the incoming $FeCl_3$-$AlCl_3$ gas flow through lines 194. Effluent gas from above the electrolyte surface in the positive electrode chamber is pumped through line 212 to be enriched in $FeCl_3$ and returned to the cell through lines 194. Large quartz tube 316 connects the top of cell 142 to the bottom of the storage reservoir 156 that is located above it (see FIG. 5). Overflow line 214 allows electrolyte to flow from the cell 142 to storage reservoir 146 (see FIG. 5).

In FIG. 9, the cross-section of discharging cell 142 on the line 9—9 of FIG. 8, negative iron rod lead 189 is embedded in negative electrode graphite rod 282. Porous quartz separator 292 is located between negative electrode chamber 280 and positive electrode chamber 290. Embedded in graphite cylindrical positive electrode 294 are four iron rod positive electrode leads 192.

The charging of the cell is carried out at about 700° C. at a charging voltage of about 0.65 volt and with a charging current density within the cell of about 32 ma/cm². The discharging of the cell is carried out at about 250° C. at an output voltage of about 1.54 volts and with an output current density within the cell of 11 ma/cm². These voltages take into account the voltage drop due to the resistance across the cell which preferably is about 0.06 volt during charging and about 0.11 volt during discharging in the energy conversion process. These voltage drops are based on a positive electrode-negative electrode separation of about 1 centimeter in each cell.

The heat required for charging at about 700° C. is obtained from direct sunlight via a spot-focus, tracking concentrator with a concentration ratio of about 1000 focused on an absorbing cavity where the concentrated sunlight is converted to 750° C. to 800° C. heat at an efficiency of about 0.60. The charging process is carried out in cells which are used solely for charging and the discharging process is carried out in cells which are used solely for discharging. The two types of cells may have different geometries, different electrode materials, different separator materials and different container materials. This requires that iron dendrites deposited on the negative electrode during charging at about 700° C. be physically dislodged and physically moved to storage and then to the negative electrode chamber of a different cell for discharging at 250° C. The dislodging and transport of the iron dendrites, which takes place at temperatures below the magnetic Curie temperature of iron, 770° C., is accomplished by the appropriate application of magnetic fields from outside the closed energy conversion system. Since ferric chloride gas is generated at the positive electrode during charging at about 700° C., it is condensed in a storage reservoir at lower temperature and revaporized as needed to the positive electrode chamber of a different cell for discharging at about 250° C. The following description, with reference to FIGS. 5 to 9, of the operation of a practical and economical energy conversion process of this invention will be in terms of the cyclic operation of a single charging cell at about 700° C., in conjunction with a single discharging cell at about 250° C. The total amount of chemical reactants and products chosen for describing the process is arbitrary and can be scaled-up to fit any desired level of electrochemical energy storage and electrical energy output. To achieve a predetermined output electric current and voltage, a number of cells are electrically connected in a series-parallel arrangement. The reductant (i.e., Fe dendrites) and the oxidant (i.e., FeCl₃ gas) produced by the charging process at about 700° C. are stored in separate reservoirs and then used to feed the discharging cell at about 250° C. when electrical energy is desired. In order to describe the operation of the closed system and its cyclic process, calculations were made on energy consumed and generated and on materials balance for each step of the proposed process. The following chemical and physical equilibria were used in the calculations:

$3\ FeCl_2(s) \rightleftharpoons Fe(s) + 2\ FeCl_3(g)$ (a)

$FeCl_2(s) \rightleftharpoons FeCl_2(l)$ (b)

$FeCl_3(s) \rightleftharpoons FeCl_3(l)$ (c)

$2\ FeCl_3(l) \rightleftharpoons Fe_2Cl_6(g)$ (d)

$Fe_2Cl_6(g) \rightleftharpoons 2\ FeCl_3(g)$ (e)

$FeCl_2(s) + 2\ AlCl_3(l) \rightleftharpoons Fe(AlCl_4)_2(l)$ (f)

$AlCl_3(s) \rightleftharpoons AlCl_3(l)$ (g)

$2\ AlCl_3(l) \rightleftharpoons Al_2Cl_6(g)$ (h)

$AlCl_3(l) + NaAlCl_4(l) \rightleftharpoons NaAl_2Cl_7(l)$ (i)

$Fe(AlCl_4)_2(s) \rightleftharpoons Fe(AlCl_4)_2(l)$ (j)

$Fe_2Cl_6(g) + Al_2Cl_6(g) \rightleftharpoons 2\ FeAlCl_6(g)$ (k)

The values of standard heat of reaction ($\Delta H°$) and standard entropy of reaction ($\Delta S°$) for reactions (a) through (k) were obtained partly from the scientific literature and partly from laboratory research and were used in conventional thermodynamic calculations in the temperature range 179° C. to 700° C. The results are tabulated below.

TABLE VI

| Reaction | $\Delta H°$ (Calories) | $\Delta S°$ (Calories/°K.) |
|---|---|---|
| a | 134132 | 106.116 |
| b | 10280 | 10.821 |
| c | 10360 | 17.954 |
| d | 10560 | 17.395 |
| e | 34136 | 52.612 |
| f | −3389 | −1.493 |
| g | 8450 | 18.145 |
| h | 7979 | 18.703 |
| i | −4367 | −7.652 |
| j | 16620 | 33.857 |
| k | 0 | 2.755 |

The values of standard heat capacity, $C.°_p$, at constant pressure which are also used in the calculations in the temperature range 179° C. to 700° C. are tabulated below.

TABLE VII

| Material | Heat Capacity/Mole (Calories/°K.) |
|---|---|
| Fe(s) | 10.29 |
| FeCl₂(s) | 20.20 |
| FeCl₂(l) | 24.24 |
| FeCl₃(s) | 30.33 |
| FeCl₃(l) | 32.00 |
| Fe₂Cl₆(g) | 43.20 |
| AlCl₃(s) | 31.27 |
| AlCl₃(l) | 30.00 |
| Al₂Cl₆(g) | 42.14 |
| NaAlCl₄(s) | 44.60 |
| NaAlCl₄(l) | 46 (estimated) |
| Fe(AlCl₄)₂(s) | 80 (estimated) |
| Fe(AlCl₄)₂(l) | 82 (estimated) |

The following description details the various steps of one embodiment of the closed-loop process of the present invention. Thermal charging, electrochemical storage, and electric energy discharging steps are based on 1 Faraday of electric charge passed through the cell during charging at about 700° C. 1.5 gram mole of FeCl₂ is converted to 0.5 gram mole of Fe and 1 gram mole of FeCl₃ which are stored separately for an indefinite period of time and then recombined during discharging at about 250° C. to generate 1 Faraday of electric charge in an external circuit and convert the 0.5 gram mole of Fe and the 1 gram mole of FeCl₃ plus 3 gram moles of AlCl₃ into 1.5 gram moles of Fe(AlCl₄)₂ which is a liquid above 218° C. The 1.5 gram moles of Fe(AlCl₄)₂ is dissociated in a storage reservoir at about 700° C. into 1.5 gram moles of liquid FeCl₂ plus 3 gram moles of AlCl₃ gas to complete the material cycle. The gas in the system, which is either AlCl₃ or an AlCl₃-

FeCl3 mixture, is kept at about 1 atmosphere pressure. (The terms "FeCl3 gas" and "AlCl3 gas" are used to simplify the material balance description. Actually, "FeCl3 gas" refers to a mixture of FeCl3 and Fe2Cl6 gas in which the proportion of FeCl3 increases at higher temperature. Likewise, "AlCl3 gas" refers to a mixture of AlCl3 and Al2Cl6 gas in which the proportion of AlCl3 increases at higher temperature).

In the embodiment represented by FIG. 5, the electrochemical cells, storage reservoirs and connecting leads or pipes are all constructed of fused quartz by well known glass fabrication techniques. This provides a hermetically-tight system into which no air or moisture can leak and from which none of the chemicals involved in the electrochemical reactions are lost. In future embodiments other ceramic materials such as alumina or mullite may be preferred to quartz for better corrosion resistance, but at present, methods for making hermetically-tight systems with such materials are not as well developed. In this embodiment the total gas pressure of AlCl3 gas and FeCl3 gas mixtures within the system is kept in the neighborhood of 1 atmosphere by means of careful temperature control of the storage reservoirs containing solid solution mixture of AlCl3 and FeCl3. If in future embodiments it is desired to store the AlCl3 and FeCl3 as liquid solution mixtures, then the total gas pressure of AlCl3 and FeCl3 gas mixtures would have to be kept at about 3.5 atmospheres.

FIGS. 5, 6, 7, 8, and 9 are referred to in the following description of the energy conversion process.

In operation of the electrochemical charging step, a tracking solar concentrator (not shown) focuses a beam of sunlight at about 1000 suns intensity into the cavity of a receiver (not shown) where it is absorbed and converted to 750° C. to 800° C. thermal energy at an overall efficiency of about 0.60. This thermal energy is transferred by means of a heat transfer fluid and heat exchanger (not shown) to the storage reservoir 144 for FeCl2 (FIG. 5) and to the 700° C. electrochemical charging cell 140. A fused salt (FS) electrolyte mixture at about 218° C. containing 0.21 mole FeCl3 + 1.09 mole AlCl3 + 1.50 mole Fe(AlCl4)2 is transferred from storage reservoir 146 via pump 158 and line 160 through trap 162 into storage reservoir 144 where it is rapidly heated to about 700° C. to produce 0.21 mole FeCl3 gas + 4.09 moles AlCl3 gas and 1.50 moles of liquid FeCl2 (melting point 677° C.). The rate of pumping of electrolyte mixture into storage reservoir 144 is synchronized with the charging electric current through electrochemical cell 140. The purpose of trap 162 is to prevent flow of electrolyte back to storage reservoir 146 from trap 162 as the FeCl3-AlCl3 gas pressure builds up in storage reservoir 144. The term "mole" means "gram mole" in this description. Valve 166 is kept closed until the FeCl3-AlCl3 gas pressure in storage reservoir 144 has force liquid FeCl2 electrolyte through line 164 up into charging cell 140 to desired level 266 (FIG. 6). From then on valve 166 opens as needed to release FeCl3-AlCl3 gas through line 168 to maintain FeCl2 electrolyte level at 266. The related gas bubbles up through the positive electrode chamber 262 and helps sweep-out FeCl3 gas being produced at positive graphite electrode 220 by the charging current. This sweeping action helps to keep the charging voltage from rising above about 0.65 volt during the charging operation. The FeCl3-AlCl3 gas mixture is removed from positive electrode chamber 262 via quartz line 176.

The top of the positive cylindrical electrode 220 is at 222. Electrons are carried from positive electrode 220 to the external source of electrical energy (not shown) by means of iron rods 172 which are each hermetically sealed to quartz cell 140 by quartz-glass graded seals 226, glass-kovar seals 228, and kovar-iron rod solder seals 230. These iron rod electrical leads are embedded in deep holes fabricated into the positive graphite electrode 220. The relative diameters of the rods and holes are such that good electrical contact is established between the iron rods and the graphite electrode at the 700° C. operating temperature of cell 140.

Electrons are carried from the external source of electrical energy for the charging operation to the graphite rod negative electrode 234 in the center of negative electrode chamber 238 by means of iron rod electrical lead 170. Lead 170 is hermetically sealed to quartz cell 140 in the same manner as the positive electrode leads 172 described above. The electrochemical charging reaction involves the generation of FeCl3 gas at the positive electrode 220 and deposition of Fe dendrites on the negative electrode 234 in cell 140. Porous quartz separator 244 serves to prevent FeCl3 from migrating into the negative electrode chamber 238 from positive electrode chamber 262 where it would react with Fe dendrites and waste electrochemical energy. Separator 244 is attached by means of a fused quartz seal 246 to non-porous fused quartz cylinder 248 which is sealed to cell 140 for support.

As the Fe dendrites are deposited on negative electrode 234, they are dislodged by axial turning of two quartz rods 250 around negative electrode 234 and fall to the bottom of negative electrode chamber 238. Each of the quartz rods is sealed at the lower end to a quartz bulb 252 in which is enclosed an iron ball 254. The two iron balls are attracted by an external magnetic field such that rods 250 rotate about negative electrode 234. The quartz bulbs 252 are connected dumbell-fashion to a quartz ring 256 supported concentrically around fused quartz rod 236. The two quartz rods 250 are attached at the top to quartz ring 258 arranged concentrically about negative electrode 234 to provide additional support and stability. The iron dendrites in the bottom of negative electrode chamber 238 are moved by means of an external magnetic field through quartz line 174 (FIG. 5) to storage reservoir 156. Line 174 is kept at about 700° C. all the way from cell 140 to storage reservoir 156 to prevent FeCl2 electrolyte adhering to Fe dendrites from solidifying and attaching Fe dendrites to the walls of line 174. Storage reservoir 156 is kept at about 250° C. Simultaneously with the transfer of Fe dendrites to storage reservoir 156 is the transfer of the FeCl3 gas generated at positive electrode 220 along with the FeCl3-AlCl3 gas mixture admitted to cell 140 through lines 168 to storage reservoirs 148, 150, 152 and 154 via fused quartz line 176 and valve 178. The purpose of fused quartz line 186 and valve 188 is to provide a means for adding or removing AlCl3 gas from negative electrode chamber 238 of cell 140 to maintain the proper gas pressure balance between chambers 262 and 238 (FIGS. 6 and 7). Similarly, AlCl3 gas from storage reservoir 154 is admitted to storage reservoir 156 via line 200 and valve 198 (FIG. 5) to convert solid FeCl2 adhering to the Fe dendrites to liquid Fe(AlCl4)2 which drains down into the negative electrode chamber 280 of the fused quartz discharging cell 142 via large quartz tube 316 (FIG. 8).

The positive graphite electrode 220 of cell 140 (FIG. 6) is supported on the bottom by the curving sides of cell 140. The negative graphite electrode 234 of cell 140 is supported on the bottom by fused quartz rod 236 which is sealed to the bottom of cell 140. If positive electrode 220 is chemically attacked by the $FeCl_3$ during the charging operation at 700° C., it may be necessary to protect the graphite surface by a coating of vitreous carbon. The iron rod electrical leads for both electrodes in cell 140 are protected from exposure to $AlCl_3$ and $FeCl_3$ gas by graphite sleeves 240 which extend from the top of the corresponding electrode (220 and 234) up into the fused quartz lead tubes 242 to a point where the temperature is maintained at less than 100° C. as compared to the 700° C. temperature of cell 140. $AlCl_3$ and $FeCl_3$ vapors condense to a solid in the annular space between graphite sleeves 240 and lead tubes 242 and form a tight seal to prevent upward migration of $AlCl_3$ gas and $FeCl_3$ gas.

For each Faraday of electric charge passed through cell 140 during the charging operation, 1.50 moles of liquid $FeCl_2$ is fed to cell 140 through line 164, 0.21 mole $FeCl_3$ gas and 4.09 mole $AlCl_3$ gas are passed into cell 140 through valve 166 and lines 168 (FIGS. 5 and 6) and bubbled up through the $FeCl_2$ electrolyte in the positive electrode chamber 262. Simultaneously, 1.00 mole of $FeCl_3$ is generated at positive electrode 220 to mix with the purging $FeCl_3$-$AlCl_3$ gas mixture to yield a gas mixture of 1.21 moles of $FeCl_3$ and 4.09 moles of $AlCl_3$ which is passed to storage reservoirs 148, 150, 152 and 154 via line 176 and valve 178; and 0.50 mole of Fe dendrites is deposited on the negative electrode 234 and then dislodged and transferred by magnetic fields to storage reservoir 156 via line 174. For each Faraday of electric charge passed through the cell in the overall charging process, a total of 114,250 calories of 700° C. thermal energy is supplied from sunlight via the tracking concentrator and receiver and 15,000 calories of electrical energy is supplied at an applied voltage of 0.65 volts by a Rankine cycle heat engine and generator operated by the heat evolved concurrently with the charging operation from the cooling and storage of the 0.5 mole of Fe dendrites, 1.21 moles of $FeCl_3$ gas and 4.09 moles of $AlCl_3$ gas emerging from cell 140 at 700° C. during the charging operation. Hence all the energy required by the charging operation is supplied by sunlight and amounts to 114,250 calories of thermal energy at 700° C. per Faraday of charging.

The following description refers to the separation, cooling, and storage steps of the energy conversion process of the present invention. For each Faraday of electric charge passed through cell 140 (FIG. 5) at the charging temperature of about 700° C., 0.50 mole of Fe reductant is generated in the form of dendrites and transferred to storage reservoir 156 and 1.00 mole of $FeCl_3$ oxidant is generated and transferred along with 0.21 mole of $FeCl_3$ + 4.09 moles of $AlCl_3$ purge gas mixture to storage reservoirs 148, 150, 152 and 154. In the course of cooling these materials to the appropriate temperatures and storing them for later electrochemical recombination to produce direct current electrical energy, a total of 129,008 calories of heat is evolved. 19,091 calories of this heat is used via a heat exchanger (not shown) through which a portion of line 176 between cell 140 and valve 178 passes along with a portion of line 160 between trap 162 and storage reservoir 144 to raise the temperature of the electrolyte feed from storage reservoir 146 from 218° C. to about 335° C. as it enters storage reservoir 144. This is part of the charging operation described above and is synchronized with the charging current. 93,750 calories of the evolved heat is fed to a Rankine cycle heat engine (not shown) which at an assumed efficiency of 0.16 generates 15,000 calories of electrical energy via a direct current generator (not shown) to provide the electrical energy required for the charging operation. This is possible because the charging and storing operations proceed simultaneously. 78,750 calories of about 40° C. heat are evolved from the Rankine cycle heat engine and used for building space heating or stored for later such use.

In addition to the above disposition of most of the 129,008 calories of heat evolved in the fuel storage operation, 8,987 calories of heat is stored in a heat storage reservoir (not shown) at about 450° C. and 7,180 calories of heat is stored in a second heat storage reservoir (not shown) at about 300° C. This stored heat is used to vaporize $FeCl_3$ and $AlCl_3$ from storage for electrochemical recombination with Fe dendrites (from storage) in discharging cell 142 when electrical energy is needed. This step will be discussed in more detail in the next section on electrochemical recombination of fuel to produce electrical energy on demand.

The $FeCl_3$-$AlCl_3$ gas mixture from cell 140 is cooled from 700° C. to 250° C. during transfer via line 176 and valve 178 to storage reservoir 148 which is held at a constant temperature of 250° C. at all times. A solid solution of $FeCl_3$-$AlCl_3$ having a mole fraction composition of about 0.87 $FeCl_3$ + 0.13 $AlCl_3$ condenses at 250° C. from the gas mixture in storage reservoir 148. The residual gas is enriched in $AlCl_3$. If, as the charging operation continues, the residual gas pressure in storage reservoir 148 exceeds 1 atmosphere by a prescribed amount, valve 180 is opened and the residual gas is allowed to pass into storage reservoir 150 which is at some temperature between 225° and 250° C. When the residual gas pressure in storage reservoir 150 exceeds 1 atmosphere by a prescribed amount, reservoir 150 is cooled gradually to a minimum of 225° C. where it is held constant. The mole fraction composition of the $FeCl_3$-$AlCl_3$ solid solution condensing at 225° C. in reservoir 150 is about 0.74 $FeCl_3$ + 0.26 $AlCl_3$.

As the charging operating continues and the gas pressure in reservoir 150 exceeds 1 atmosphere by a prescribed amount, valve 182 is opened to allow residual gas to pass into storage reservoir 152 which is at a temperature between 185° C. and 225° C. Residual $FeCl_3$-$AlCl_3$ enriched in $AlCl_3$ now flows from line 176 through storage reservoirs 148 and 150 and into 152. When the residual gas pressure in reservoir 152 exceeds about 1 atmosphere by a prescribed amount, reservoir 152 is cooled gradually to a minumum of 185° C. where it is held constant. The mole fraction composition of the $FeCl_3$-$AlCl_3$ solid solution condensing at 185° C. in storage reservoir 152 is about 0.16 $FeCl_3$ + 0.84 $AlCl_3$. As charging continues and the residual gas pressure in storage reservoir 152 exceeds 1 atmosphere by a prescribed amount, valve 184 is opened to allow residual gas to pass into storage reservoir 154 which is at a temperature between 179° C. and 185° C. Reservoir 154 is now gradually cooled to about 179° C. to keep the residual pressure from rising above about 1 atmosphere. The solid solution condensing at 179° C. in reservoir 154 has the mole fraction composition of about 0.004 $FeCl_3$ + 0.996 $AlCl_3$. For the duration of charging, valves 180, 182 and 184 remain open and the temperatures of the storage reservoirs remain at 250° C. for reservoir 148, 225° C. for reservoir 150, 185° C. for reservoir 152 and about 179° C. for reservoir 154. The temperature of reservoir 154 may be adjusted upwards or downwards slightly from 179° C. to hold the residual $FeCl_3$-$AlCl_3$ gas pressure in reservoirs 148, 150, 152 and 154 at about 1 atmosphere. At the end of charging, the temperatures of reservoirs 148, 150, 152 and 154 are held fixed and valves 178, 180, 182 and 184 are closed. All valves in the overall system shown in FIG. 5 are assumed to be closed unless specifically mentioned otherwise in the description of the overall process.

During the charging operation, for each Faraday of electrical charge passed through cell 140, 0.38 mole of $FeCl_3$ and 0.06 mole of $AlCl_3$ are stored as a solid solution in storage reservoir 148 at 250° C., 0.55 mole of $FeCl_3$ and 0.20 mole of $AlCl_3$ are stored as a solid solution in storage reservoir 150 at 225° C., 0.27 mole of $FeCl_3$ and 1.40 moles of $AlCl_3$ are stored as a solid solution in storage reservoir 152 at 185° C., and 0.01 mole of $FeCl_3$ and 2.43 mole of $AlCl_3$ are stored as a solid solution in storage reservoir 154 at about 179° C. This amounts to a total of 1.21 moles of $FeCl_3$ and 4.09 moles of $AlCl_3$ stored per Faraday of charging.

The following description refers to the electrochemical recombination step wherein the products of the charging step, which optionally can be stored, are reacted in an electrochemical discharging cell for the production of electrical energy. Electrical energy can be generated as needed in electrochemical discharging cell 142, as shown in FIGS. 5, 8 and 9, either during the charging process or at any later time.

Fe dendrites produced in the charging operation are fed by gravity and magnetic fields from storage reservoir 156 at 250° C. into the negative electrode chamber 280 (FIG. 9) of discharging cell 142 at 250° C. This insures that negative electrode chamber 280 is always loaded with sufficient Fe dendrites to maintain good electrical contact at all times between the Fe dendrites and graphite rod negative electrode 282. When electrical energy is needed, Fe dendrites give up electrons to negative electrode 282 and become $Fe^{2+}$ ions in the electrolyte in chamber 280. These electrons are conducted to the external circuit (not shown) via iron rod lead 189 and iron rod lead 190 which are electrically connected by right angled sleeve weld 191. The electrons perform useful electrical work in the external circuit and are returned to cell 142 via iron rod leads 192 and graphite cylinder positive electrode 294. The electrons combine with $FeCl_3$ in the fused salt electrolyte in positive electrode chamber 290 and with $Fe^{2+}$ ions conducting electrical current through cell 142 from negative electrode chamber 280 to positive electrode chamber 290 via porous quartz separator 292 to produce $FeCl_2$ in the electrolyte in positive electrode chamber 290. The $FeCl_2$ reacts with $AlCl_3$ in the fused salt electrolyte in chamber 290 to form $Fe(AlCl_4)_2$ which has a melting point of about 218° C. and hence is a liquid at 250° C. It is important to chemically combine the $FeCl_2$ in this manner to form a compound which is very soluble in the electrolyte melt at 250° C., because $FeCl_2$ otherwise has very low solubility in the fused salt electrolyte at 250° C. and would precipitate on the positive electrode surface so as to greatly increase the internal electrical resistance of the cell and decrease the overall thermal to electrical energy conversion efficiency of the process.

In this description, the composition of the electrolyte in the positive electrode chamber 290 is held at about 0.09 $FeCl_3$+0.30 $AlCl_3$+0.61 $Fe(AlCl_4)_2$ (mole fractions) and the composition of the electrolyte in the negative electrode chamber 280 is held at about 0.31 $AlCl_3$+0.69 $Fe(AlCl_4)_2$ (mole fractions). It is assumed the $Fe^{2+}$ ions produced by ionization of $Fe(AlCl_4)_2$ into $Fe^{2+}$ ions and $AlCl_4^-$ ions conducts the electrical current through the discharging cell 142 at 250° C. If the electrical conductivity by this means is too small to be practical, then $NaAlCl_4$ electrolyte is added to provide sufficient conductivity by means of $Na^+$ ions. (In that event the procedure given here would have to be modified to take that into account). The composition of the electrolyte in positive electrode chamber 290 is controlled by adjusting the rate of feed of $FeCl_3$-$AlCl_3$ gas mixture to the bottom of the chamber from storage reservoir 148 via valve 196 and line 194 (see FIG. 5) so as to hold the open circuit cell voltage of cell 142 at about 1.65 volt. The open circuit cell voltage can be determined by measuring output cell voltage and current to the external circuit, provided the internal resistance of the cell is known. Such controls can be made automatic where needed in this process with the aid of a minicomputer, appropriate sensors and servo mechanisms. The composition of the electrolyte in negative electrode chamber 280 is controlled by maintaining an $AlCl_3$ gas pressure of about 1 atmosphere on the surface of the electrolyte in chamber 280 at level 298 by adding or removing $AlCl_3$ gas via storage reservoir 156, valve 198 and line 200 from $AlCl_3$ storage reservoir 154. This also serves as a means for keeping the liquid level 298 of the electrolyte in chamber 280 about the same as that in positive electrode chamber 290. The $AlCl_3$ gas pressure in storage reservoir 154 is varied as needed by controlled small changes in the temperature of reservoir 154.

The iron rod electrical leads for cell 142 are hermetically sealed to the cell by quartz tube leads 300, fused quartz-glass graded seals 302, glass-kovar seals 304, and kovar-iron lead soldered joints 306. The iron rod leads fit into deep holes in the respective graphite electrodes so sized as to give good electrical contact between electrode and iron lead at the cell 142 operating temperature of 250° C. This arrangement also serves to protect the iron rod leads from attack by the fused salt electrolyte. The iron leads are also protected from $AlCl_3$ gas and $FeCl_3$ gas in the gas space above the fused salt electrolyte by graphite sleeves in the same manner as described previously for charging cell 140. Iron leads 189 and 190 are not protected from $AlCl_3$ gas in the neighborhood of weld 191. These leads are not subject to attack because no $FeCl_3$ gas is present, and even if $FeCl_3$ gas were accidently present in this region, it should quickly be removed by reaction with the Fe dendrites from storage reservoir 156 to form first $FeCl_2$ and then $Fe(AlCl_4)_2$.

It is assumed in this description that the $FeCl_3$ in positive electrode chamber 290 does not severely intercalate the graphite positive electrode 294 and cause it to weaken and disintegrate into graphite powder. This is a reasonable assumption since the cell temperature (250° C.) is relatively low and is not cycled up and down so as to alternately take up $FeCl_3$ in the graphite lattice and then expel it. If graphite positive electrode disintegration or excessive swelling does occur, it might be avoided by fabricating new graphite positive electrodes and sleeves protected at the surface by a tightly adhering thin film of vitreous carbon.

Porous fused quartz separator 292 is sealed at the bottom to fused quartz cell 142 and is unattached at the top to allow for thermal expansion. Its purpose is to prevent migration of $FeCl_3$ from the electrolyte in positive electrode chamber 290 to the electrolyte in chamber 280 where it would react with Fe dendrites and decrease electrical energy output. If the $FeCl_3$ migration rate is found to be too large, the process can be designed to allow for net flow of electrolyte from negative electrode chamber 280 into positive electrode chamber 290 via separator 292 to counteract the tendency of the $FeCl_3$ to migrate in the opposite direction. Non-porous fused quartz tube 308 is sealed to the top of cell 142, and dips down below the surface of the electrolyte to provide a gas-tight barrier between chambers 280 and 290. It is fairly close-fitting to the upper portion of the separator 292 to provide a narrow annular region filled with electrolyte to decrease the rate of diffusion of $FeCl_3$ gas from positive electrode chamber 290 to negative electrode chamber 280 through this annular region via the fused salt electrolyte. It is advantageous if the top portion of separator 292 which overlaps quartz tube 308 is non-porous to reduce the rate of $FeCl_3$ diffusion from positive electrode chamber 290 to negative electrode chamber 280. Large quartz tube 316 connects the top of cell 142 to the bottom of storage reservoir 156 (see FIG. 5) to provide the passageway for Fe dendrites to drop from reservoir 156 directly into negative electrode chamber 280.

When electrical energy is needed from cell 142, pump 202 recirculates effluent gas containing about 0.95 mole fraction $AlCl_3$ and 0.05 mole fraction $FeCl_3$ from above the electrolyte surface 298 in positive electrode chamber 290 through line 212 and through one or more of fuel storage reservoirs 148, 150, 152 and 154 where it picks up sufficient $FeCl_3$ and $AlCl_3$ by sublimation of stored solid solution fuel to enrich the $FeCl_3$ content of the gas to a composition of about 0.17 mole fraction $FeCl_3$ and 0.83 mole fraction $AlCl_3$. This $FeCl_3$-enriched gas is pumped by circulating pump 202 through one or more storage reservoirs 148, 150, 152 and 154 and then through valve 196 and line 194 to the bottom of positive electrode chamber 290 of cell 142 where it bubbles up through the electrolyte. As the gas bubbles up through the electrolyte in chamber 290, it gives up $FeCl_3$ and $AlCl_3$ in the molar ratio of about 0.24 $FeCl_3$ to 0.76 $AlCl_3$ to the fused salt electrolyte so as to electrochemically combine with $Fe^{2+}$ ions and electrons at the positive electrode 294 to produce additional electrolyte of composition, 0.09 mole fraction $FeCl_3 + 0.30$ mole fraction $AlCl_3 + 0.61$ mole fraction $Fe(AlCl_4)_2$. Consequently, by the time the gas bubbles reach the surface 298 of the electrolyte in positive electrode chamber 290 their composition has decreased in $FeCl_3$ content to about 0.05 mole fraction $FeCl_3 + 0.95$ mole fraction $AlCl_3$.

Only one valve of the four valves 204, 206, 208 and 210 will be open at any one time when circulating pump 202 is operating. If fuel storage reservoirs 148, 150, 152 and 154 are each fully loaded with $FeCl_3$-$AlCl_3$ solid solution compositions described in the preceding section on electrochemical fuel storage, then valve 204 to reservoir 148 will be opened when pump 202 is operating. When the pressure of $FeCl_3$-$AlCl_3$ gas in reservoir 148 decreases below a prescribed value near 1 atmosphere as the discharging process continues and with the temperature of reservoir 148 held at 250° C., then valve 204 is closed and valve 206 to reservoir 150 is opened. At this point $FeCl_3$-$AlCl_3$ gas from pump 202 is forced first through 150, then through 148, and then to the bottom of positive chamber 290 of cell 142 via line 194. If the gas pressure in 148 again falls below the prescribed value, the temperature of reservoir 150 will be gradually raised from 225° C. to 250° C. where it is held constant. As the discharging process in 142 continues and the gas pressure in 148 falls below the prescribed value, valve 206 is closed and valve 208 to reservoir 152 is opened. As more electrical energy is generated, the pressure in reservoir 148 is held essentially constant by gradually raising the temperature of reservoir 152 from 185° C. to 250° C. where it is held constant. As the process continues and the gas pressure in reservoir 148 falls below the prescribed value, valve 208 is closed and valve 210 to reservoir 154 is opened. As electrical energy continues to be generated by cell 142, the pressure in 148 is kept essentially constant by gradually increasing the temperature of reservoir 154 from about 179° C. to 250° C. At this point a total of 1.21 moles of $FeCl_3$ and 3.73 moles of $AlCl_3$ have been sublimed from storage reservoirs 148, 150, 152 and 154 and electrochemically reacted in cell 142 with 0.5 mole of Fe dendrites from storage reservoir 156 to produce 0.21 mole of $FeCl_3 + 0.73$ mole of $AlCl_3 + 1.50$ moles of $Fe(AlCl_4)_2$ in the fused salt electrolyte of positive electrode chamber 290 per Faraday of electric charge circulated by cell 142 through an external electrical circuit at a cell output voltage of about 1.54 volts. During the discharging process in order to keep the composition of electrolyte in chamber 290 of cell 142 approximately at 0.09 $FeCl_3 + 0.30$ $AlCl_3 + 0.61$ $Fe(AlCl_4)_2$ in mole fractions, the $FeCl_3$-$AlCl_3$ gas pumping rate of recycling pump 202 is synchronized with output current and voltage of cell 142 so as to keep the output voltage plus the product of output current and internal resistance of cell 142 essentially constant at about 1.65 volts (i.e. open circuit cell voltage). Following this procedure keeps the composition of the $FeCl_3$-$AlCl_3$ inlet gas to cell 142 essentially constant during discharging.

The fused salt electrolyte of 0.21 mole $FeCl_3 + 0.73$ mole of $AlCl_3 + 1.5$ mole of $Fe(AlCl_4)_2$ produced in chamber 290 per Faraday of electric charge generated by cell 142 overflows from cell 142 into storage reservoir 146 via line 214 and gravity. During the course of flowing from chamber 290 into 146, the fused salt electrolyte is cooled from 250° C. to about 218° C. with the evolution of about 4,852 calories of heat. This heat is removed via a heat exchanger (not shown) and 3,235 calories of it is used to vaporize 0.36 mole of $AlCl_3$ from storage reservoir 154 into the fused salt electrolyte in storage reservoir 146 via valve 216 and line 218. This additional 0.36 mole increases the $AlCl_3$ content of storage reservoir 146 so that at about 218° C., reservoir 146 has accumulated 0.21 mole $FeCl_3 + 1.09$ mole $AlCl_3 + 1.50$ mole $Fe(AlCl_4)_2$ per Faraday of electric charge generated by cell 142 at 250° C. The additional $AlCl_3$ in the fused salt electrolyte in reservoir 146 serves to keep the equilibrium gas pressure of $FeCl_3$-$AlCl_3$ gas mixture at about 1 atmosphere when the fused salt electrolyte from cell 142 is cooled to 218° C. in reservoir 146.

From the foregoing description it can be seen that the steps of charging, fuel storage, and discharging represent an overall material balance cycle. No material enters or leaves the apparatus. Hence, a very large number of energy conversion cycles are possible with this system without adding any more material after the apparatus is initially sealed. The only thing added during the process is high grade heat at about 700° C., preferably from sunlight. This high grade heat is converted to electrochemical energy and lower grade heat for desired applications such as supplying electrical energy for electric motors, electric lights and generation of portable fuel such as hydrogen gas by electrolysis of water, and supplying low grade heat for space heating of buildings.

For each Faraday of electric charge supplied to an external electrical circuit by cell 142 during the discharging operation at 250°, 71,135 calories of heat are required to sublime a total 1.21 moles of FeCl$_3$ gas and 3.73 moles of AlCl$_3$ gas to cell 142 at 250° C. from reservoirs 148, 150, 152 and 154. This material is necessary to carry out the overall electrochemical reaction, $$Fe(s)+2FeCl_3(g)+6AlCl_3(g) \rightleftharpoons 3Fe(AlCl_4)_2(FS),$$

in cell 142. Of this required heat, 53,351 calories is supplied by the electrochemical reaction above and the heat of condensation of the unreacted FeCl$_3$ and AlCl$_3$. 8,987 calories of heat is supplied from the 450° C. thermal storage reservoir (not shown), 7,180 calories of heat is supplied from the 300° C. thermal storage reservoir (not shown), and 1,617 calories of heat is supplied from the cooling of the effluent electrolyte from cell 142 to 218° C. for storage in storage reservoir 146. The 450° C. and 300° C. thermal storage reservoirs were mentioned in the section on the fuel storage operation. The electrochemical reaction in cell 142 also generates about 35,500 calories of useful electrical energy at an output direct current voltage of about 1.54 volts per Faraday of charge passing through cell 142. This is the most important product of the overall process.

If problems are encountered with low electrical conductivity in the fused salt electrolyte in cell 142 in the discharging operation or with poor dendrite growth of Fe in cell 140 in the charging operation, it may be desirable to add NaAlCl$_4$ to the fused salt electrolyte in the overall process. This will result in greater ionic conductivity in the discharging process at 250° C. and improved dendritic growth of Fe in the charging process which may then be carried out at a cell temperature less than 700° C. In this event the material balance relations and thermal energy requirements would be modified in the description of the overall process.

In summary, for the overal practical process described above, 114,250 calories of 700° C. heat, preferably from concentrated sunlight, is absorbed per Faraday of charging, 78,750 calories of 40° C. heat is produced during the fuel storage operation per Faraday for space heating of buildings or storage for later such use, and 35,500 calories of useful electrical energy is produced at an output direct current voltage of 1.54 volts during the discharging operation at 250° C. per Faraday. An important feature of the process is that the electrochemical fuel produced in the charging operation can be stored for extended periods of time and then reacted in an electrochemical cell to produce useful electrical energy when needed.

The thermal/electrical energy conversion efficiency, $\eta_{t/e}$, is $$\eta_{t/e} = 35500/114250 = 0.31$$

and the overall solar/electrical energy conversion efficiency $\eta_{s/e}$ of the process as described including the feature of long term electrochemical fuel storage is $$\eta_{s/e} = 0.19$$

assuming sunlight can be converted to usable 700° C. thermal energy at an efficiency of about 0.60.

If one-half the 40° C. heat produced during the electrochemical fuel storage operation can be effectively used for space heating of buildings, then the fraction of the direct sunlight incident on the tracking concentrator which is effectively used is about 0.39. This high utilization factor could result in very favorable economics for the process described here.

One of the major tasks in the perfecting of the system described herein is the development of pressure sensors, valves and pumps such as 158 and 202 in FIG. 5 which are compatible with the fused salt electrolytes and FeCl$_3$-AlCl$_3$ gas mixtures used in the process and give reliable performance over many years of such use. The surfaces of these items which are exposed to the interior environment of the energy conversion system needed to be resistant to chemical attack by FeCl$_3$ and AlCl$_3$. Such materials may be SiO$_2$, B$_2$O$_3$ and Al$_2$O$_3$ or combinations of them. The pressure sensors, valves and pumps in one approach may make use of moving columns of fused NaAlCl$_4$ activated where needed by AlCl$_3$ gas pressure which is controlled by controlling the temperature of appropriately positioned reservoirs containing solid AlCl$_3$. For example, AlCl$_3$ gas lift pumps may be designed for pumping the fused salt electrolyte as needed in the energy conversion process, or pressure manometers may be filled with fused NaAlCl$_4$ having small magnets supported on the fused NaAlCl$_4$ surfaces so that the liquid levels in the manometers can be detected outside the hermetically-sealed energy conversion system.

In the ultimate thermal/electrochemical energy conversion and storage process based on this invention, a number of cells are electrically connected in a combined series-parallel arrangement so as to achieve the desired output electric current and voltage as well as optimum overall performance. The cells may also be physically connected in a combined series-parallel arrangement with regard to flow of cell reactant and product streams.

Various modifications and alterations of this invention will become apparent to those skilled in the art without departing from the scope and spirit of this invention, and it should be understood that this invention is not to be unduly limited to the illustrative embodiment set forth herein.

We claim:

1. An energy conversion process for converting thermal energy into stored electrochemical energy and then into electrical energy, comprising the steps of:
   (a) heating a first FeCl$_2$-containing electrolyte melt, optionally containing one or more other metal chloride compounds, in an electrochemical charging cell to cause a first chemical reaction to take place producing
      (1) gaseous FeCl$_3$, and
      (2) a reductant product which is free iron and/or, where said optional metal chloride compound is present and is reduced in said first chemical reaction, the reductant product of said optional metal chloride compound, (b) separating said gaseous FeCl₃ and said reductant product of said reaction, (c) cooling the resulting separated gaseous FeCl₃ and reductant product to a temperature lower than the temperature of said reaction, (d) optionally storing said separated FeCl₃ and reductant product, and (e) combining, at a temperature below that of said charging cell, said separated FeCl₃ and reductant product in a second FeCl₂-containing electrolyte melt in an electrochemical discharging cell containing electrodes, to cause a second chemical reaction to take place which is the reverse of said first reaction, thereby generating said first melt, heat, and electrical energy, said second melt comprising 3 to 33 mole percent FeCl₂ and 67 to 97 mole percent of one or more other metal chloride compounds which reduce the freezing point of said discharging melt or increase its electrical conductivity.

2. An energy conversion process according to claim 1 wherein said first melt comprises at least about 10 mole percent FeCl₂, said charging cell having electrodes therein and an electrical potential applied across the latter electrodes when the operating temperature of said charging cell is between the boiling point of FeCl₃ and the boiling point of FeCl₂ and when the free energy change for said first reaction is positive.

3. An energy conversion process according to claim 1 wherein said other compounds of said first and second melts are selected from the group of compounds consisting of CrCl₃, Na₃CrCl₆, NaFeCl₄, NaCl, KCl, AlCl₃, Na₃CrCl₅, NaFeCl₃, CrCl₂, and mixtures thereof.

4. An energy conversion process according to claim 1 wherein said first melt further comprises up to 90 mole percent of one or more other metal chloride compounds which reduce the freezing point of said first melt, increase its electrical conductivity, or provide the source for said reductant product without preventing the discharge of gaseous FeCl₃ or the discharge of a complex thereof with other metal chloride compounds, from which complex gaseous FeCl₃ can be separated by heating said complex.

5. An energy conversion process according to claim 1 wherein one or more of the following chemical reactions takes place in said process:

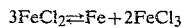

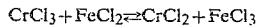

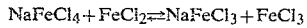

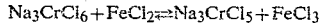

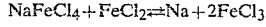

the forward reactions taking place in said charging cell and the reverse reactions taking place in said discharging cell.

6. An energy conversion process according to claim 1 wherein the heating step (a) utilizes heat obtained from solar energy.

7. An energy conversion process according to claim 1 wherein said separated FeCl₃ and said reductant product are cooled, thus producing useful high grade heat.

8. An energy conversion process according to claim 7 wherein the high grade heat produced is converted to electrical energy and useful low grade heat in a Rankine cycle engine and electrical generator.

9. An energy conversion process according to claim 1 wherein step (a) is conducted between 316° C. and the boiling point of said FeCl₂ melt, and step (e) is conducted at about one atmosphere of gas pressure and at an operating temperature below that of step (a) and above 200° C.

10. An energy conversion process according to claim 1 wherein the FeCl₂-containing electrolyte generated in step (e) is recycled for use in step (a).

11. An energy conversion process according to claim 2 wherein, in step (a), heat is absorbed and electrical energy is consumed and, in step (e), heat is evolved and electrical energy is produced, said electrical energy being in excess of said consumed electrical energy and is derived from the heat absorbed in step (a).

12. A process comprising
(a) heating a FeCl₂-containing electrolyte melt in an electrochemical charging cell and, optionally, one or more other metal chloride compounds to cause a chemical reaction to take place producing
(1) gaseous FeCl₃, and
(2) a reductant product which is free iron and/or where said optional metal chloride compound is present and is reduced in said chemical reaction, the reductant product thereof, (b) separating said gaseous FeCl₃ and said reductant product of said reaction, and (c) separately storing the resulting separated FeCl₃ and reductant product at a temperature lower than the operating temperature of the charging cell, thereby storing electrochemical energy.

13. An energy conversion process according to claim 12 wherein the FeCl₂-containing electrolyte melt comprises at least about 10 mole percent FeCl₂, said cell having electrodes therein and an electrical potential applied across said electrodes when the operating temperature of said cell is between the boiling point of FeCl₃ and the boiling point of FeCl₂ and when the free energy change for said charging cell reaction is positive.

14. An energy conversion process according to claim 12 wherein the FeCl₂-containing electrolyte melt further comprises up to 90 mole percent of one or more other metal chloride compounds which reduce the freezing point of said melt, increase its electrical conductivity, or provide the source for said reductant product without preventing the discharge of gaseous FeCl₃ or the discharge of a complex thereof with other metal chloride compounds, from which complex gaseous FeCl₃ can be separated by heating said complex.

15. An energy conversion process according to claim 12 wherein the other compounds in the FeCl₂-containing electrolyte melt are selected from the group of compounds consisting of CrCl₃, Na₃CrCl₆, NaFeCl₄, NaCl, KCl, AlCl₃, and mixtures thereof.

16. An energy conversion process for converting thermal energy into stored electrochemical energy and then into electrical energy comprising the steps of:
(a) heating a first FeCl₂-containing electrolyte melt in an electrochemical charging cell to an operating temperature above the boiling point of FeCl₃ to cause a first chemical reaction

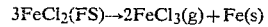

to take place, said melt comprising at least about 10 mole percent FeCl$_2$, said cell having electrodes therein and an electrical potential is applied across said electrodes when the operating temperature of said cell is between the boiling point of FeCl$_3$ and the boiling point of FeCl$_2$ and when the free energy change for said first reaction is positive, (b) separating said gaseous FeCl$_3$ and said free iron, (c) cooling the resulting separated gaseous FeCl$_3$ and free iron to a temperature lower than said operating temperature in said charging cell, (d) optionally storing said separated FeCl$_3$ and free iron, (e) combining, at a temperature below that of said charging cell, said separated FeCl$_3$ and free iron in a second FeCl$_2$-containing electrolyte melt in an electrochemical discharging cell containing electrodes, to cause a second chemical reaction $$Fe(s) + 2FeCl_3(g) \rightarrow 3FeCl_2(FS)$$

to take place, which is the reverse of said first reaction, thereby generating said first melt, heat, and electrical energy, said second melt comprising 3 to 33 mole percent FeCl$_2$ and 67 to 97 mole percent of one or more other metal chloride compounds which reduce the freezing point of said discharging melt or increase its electrical conductivity.

17. An energy conversion process according to claim 16 wherein the FeCl$_2$-containing electrolyte melt of the electrochemical charging cell further comprises up to 90 mole percent of one or more other metal chloride compounds which reduce the freezing point of said melt or increase its electrical conductivity without preventing the discharge of gaseous FeCl$_3$ or the discharge of a complex thereof with other metal chloride compounds, from which complex gaseous FeCl$_3$ can be separated by heating said complex.

18. An energy conversion process according to claim 17 wherein the FeCl$_2$-containing electrolyte melt of the electrochemical charging cell contains NaCl, KCl, AlCl$_3$, or mixtures thereof.

19. An energy conversion process according to claim 16 wherein the heating step (a) utilizes heat obtained from solar energy.

20. An energy conversion process according to claim 16 wherein said separated FeCl$_3$ and free iron are cooled, thus producing useful high grade heat.

21. An energy conversion process according to claim 16 wherein the high grade heat produced is converted to electrical energy and useful low grade heat in a combination Rankine cycle engine and electrical generator.

22. An energy conversion process according to claim 16 wherein step (a) is conducted between 316° C. and higher temperatures below the boiling point of said FeCl$_2$ melt, and step (e) is conducted at about one atmosphere of gas pressure and at an operating temperature below that of step (a) and above 200° C.

23. An energy conversion process according to claim 16 wherein the FeCl$_2$ generated in step (e) is recycled for use in step (a).

24. An energy conversion process according to claim 16 wherein an electrical potential is applied across the electrodes in said charging cell when the operating temperature thereof is between 316° C. and 1024° C. at about one atmosphere of gas pressure.

25. An energy conversion apparatus for converting thermal energy into stored electrochemical energy and then into electrical energy comprising:

(a) en electrochemical charging cell containing a first FeCl$_2$-containing electrolyte melt, optionally containing one or more other metal chloride compounds, in an electrochemical charging cell, said melt when heated causing a first chemical reaction to take place producing
(1) gaseous FeCl$_3$, and
(2) a reductant product which is free iron and/or, where said optional metal chloride compound is present and is reduced in said first chemical reaction, the reductant product thereof, (b) means for heating said electrochemical charging cell electrolyte, (c) means for separating said FeCl$_3$ and said reductant product, (d) means for cooling the resulting separated FeCl$_3$ and reductant product, (e) optionally, means for storing the resulting cooled FeCl$_3$ and reductant product, (f) an electrochemical discharging cell containing a second FeCl$_2$-containing electrolyte melt and electrodes, said second melt comprising 3 to 33 mole percent FeCl$_2$ and 67 to 97 mole percent of one or more other metal chloride compounds which reduce the freezing point of said discharging melt or increase its electrical conductivity, said discharging cell when charging with said FeCl$_3$ and reductant product results in a chemical reaction which regenerates the electrolyte of step (a) and thereby producing electrical energy, (g) means for transferring said stored FeCl$_3$ and said reductant product to said electrochemical discharging cell, (h) means for maintaining a suitable temperature in said electrochemical discharging cell to promote said reaction therein, (i) means for utilizing electrical energy from said electrochemical discharging cell, and (j) means for recycling said generated electrolyte from said electrochemical discharging cell to the electrochemical charging cell of step (a).

* * * * *

UNITED STATES PATENT AND TRADEMARK OFFICE
CERTIFICATE OF CORRECTION

PATENT NO. : 4,312,927
DATED : January 26, 1982
INVENTOR(S) : Oliver N. Salmon

It is certified that error appears in the above—identified patent and that said Letters Patent is hereby corrected as shown below:

Column 11, line 26, replace "and metal" with -- of metal --.

Column 16, line 14, replace "and down" with -- and shown --.

Column 21, line 30, replace "position electrode" with

-- positive electrode --.

Column 25, line 61, replace "related" with -- released --.

Column 38, line 42, replace "charging" with -- charged --.

Signed and Sealed this

Thirteenth Day of July 1982

[SEAL]

*Attest:*

*Attesting Officer*

GERALD J. MOSSINGHOFF

*Commissioner of Patents and Trademarks*